US012499760B2

(12) United States Patent
Avedisov et al.

(10) Patent No.: US 12,499,760 B2
(45) Date of Patent: Dec. 16, 2025

(54) DETERMINING A CONTENT OF A MESSAGE USED TO COORDINATE INTERACTIONS AMONG VEHICLES

(71) Applicant: Toyota Motor Engineering & Manufacturing North America, Inc., Plano, TX (US)

(72) Inventors: Sergei S. Avedisov, Los Gatos, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 925 days.

(21) Appl. No.: 17/458,943

(22) Filed: Aug. 27, 2021

(65) Prior Publication Data

US 2023/0060940 A1 Mar. 2, 2023

(51) Int. Cl.
*B60W 30/09* (2012.01)
*G08G 1/0967* (2006.01)
*G08G 1/16* (2006.01)

(52) U.S. Cl.
CPC ....... *G08G 1/096791* (2013.01); *B60W 30/09* (2013.01); *G08G 1/165* (2013.01);
(Continued)

(58) Field of Classification Search
CPC ............. B60W 30/09; B60W 30/0953; B60W 30/0956; B60W 30/18163;
(Continued)

(56) References Cited

U.S. PATENT DOCUMENTS 10,679,501 B2 6/2020 Caveney et al.
10,725,470 B2\* 7/2020 Mahabadi ............. B60W 30/00
(Continued)

FOREIGN PATENT DOCUMENTS

WO 2021092039 A1 5/2021

OTHER PUBLICATIONS

U.S. Appl. No. 17/067,348 to Avedisov et al., "Message Management for Cooperative Driving Among Connected Vehicles," filed Oct. 9, 2020.
(Continued)

*Primary Examiner* — Peter D Nolan
*Assistant Examiner* — Ce Li Li
(74) *Attorney, Agent, or Firm* — Christopher G. Darrow; DARROW MUSTAFA PC

(57) ABSTRACT

A system for determining a content of a message used to coordinate interactions among vehicles can include a processing device and a memory. The memory can store a discretization module and a communications module. The discretization module can include instructions that when executed by the processing device cause the processing device to: (1) analyze a critical maneuver trajectory of an ego vehicle and a current trajectory of another vehicle to determine an existence of a critical maneuver situation and (2) produce a discretized representation of a portion of the critical maneuver trajectory of the ego vehicle. A form of the discretized representation can be based on the existence of the critical maneuver situation. The communications module can include instructions that when executed by the processing device cause the processing device to communicate the discretized representation as the content of the message used to coordinate interactions among vehicles.

17 Claims, 12 Drawing Sheets

(52) U.S. Cl.
CPC ......... *G08G 1/166* (2013.01); *B60W 2520/10* (2013.01); *B60W 2520/105* (2013.01); *B60W 2520/12* (2013.01); *B60W 2520/125* (2013.01); *B60W 2552/53* (2020.02); *B60W 2554/20* (2020.02); *B60W 2554/404* (2020.02); *B60W 2554/406* (2020.02); *B60W 2556/65* (2020.02); *G08G 1/096783* (2013.01)

(58) Field of Classification Search
CPC ....... B60W 2520/10; B60W 2520/105; B60W 2520/12; B60W 2520/125; B60W 2552/53; B60W 2554/20; B60W 2554/404; B60W 2554/406; B60W 2554/80; B60W 2556/65; G05D 1/0088; G05D 1/0212; H04W 4/46
See application file for complete search history.

(56) References Cited

U.S. PATENT DOCUMENTS

| | | | | |
|---|---|---|---|---|
| 10,860,027 | B2* | 12/2020 | Nilsson | G08G 1/166 |
| 2012/0306663 | A1* | 12/2012 | Mudalige | B60W 30/09 701/1 |
| 2017/0083021 | A1* | 3/2017 | Balaghiasefi | G08G 1/163 |
| 2017/0242435 | A1* | 8/2017 | Nilsson | G08G 1/167 |
| 2017/0358210 | A1 | 12/2017 | Stewart et al. | |
| 2018/0059670 | A1* | 3/2018 | Nilsson | B60W 30/18163 |
| 2018/0257647 | A1* | 9/2018 | Jurca | G01S 13/931 |
| 2019/0355257 | A1* | 11/2019 | Caldwell | B60W 30/0956 |
| 2020/0094819 | A1* | 3/2020 | Dolgov | G08G 1/161 |
| 2020/0139967 | A1* | 5/2020 | Beller | G05D 1/81 |
| 2021/0031800 | A1 | 2/2021 | Fuchs et al. | |
| 2022/0032952 | A1* | 2/2022 | Lienke | B60W 60/0011 |
| 2022/0185288 | A1* | 6/2022 | Boydston | G06V 10/764 |
| 2022/0185330 | A1* | 6/2022 | Boydston | B60W 40/02 |
| 2022/0332350 | A1* | 10/2022 | Jha | B60W 60/0017 |
| 2022/0383750 | A1* | 12/2022 | Sharma Banjade | G08G 1/005 |
| 2022/0402485 | A1* | 12/2022 | Kobilarov | B60W 30/0956 |
| 2023/0005366 | A1* | 1/2023 | Yu | G08G 1/096725 |
| 2023/0012853 | A1* | 1/2023 | Tam | B60W 30/0953 |

OTHER PUBLICATIONS

Lehmann et al., "A Generic Approach towards Maneuver Coordination for Automated Vehicles," Proc. IEEE 21st International Conference on Intelligent Transportation Systems (ITSC), Maui, Hawaii, USA, Nov. 4-7, 2018, pp. 3333-3339.

Alejandro Correa, "Transition Areas for Infrastructure-Assisted Driving," TransAID deliverable D5.1, "Definition of V2X message sets", Aug. 2019, 83 pages.

Llatser et al., "Cooperative Automated Driving Use Cases for 5G V2X Communication," 2019 IEEE 2nd 5G World Forum (5GWF), Dresden, Germany, 2019, pp. 120-125.

Correa et al., "Infrastructure Support for Cooperative Maneuvers in Connected and Automated Driving," 2019 IEEE Intelligent Vehicles Symposium (IV), 2019, pp. 20-25.

Ploeg et al., "Cooperative Automated Maneuvering at the 2016 Grand Cooperative Driving Challenge", IEEE Transactions on Intelligent Transportation Systems, vol. 19, No. 4, Apr. 2018, pp. 1213-1226.

An et al., "Design of a Cooperative Lane Change Protocol for a Connected and Automated Vehicle Based on an Estimation of the Communication Delay", Sensors 2018, 18(10), pp. 3499-3510.

Bischoff et al., "What Cooperation Costs: Quality of Communication and Cooperation Costs for Cooperative Vehicular Maneuvering in Large-scale Scenarios," Proceedings of the 6th International Conference on Vehicle Technology and Intelligent Transport Systems (VEHITS 2020), 2020, pp. 394-405.

Unknown "On-Board System Requirements for V2V Safety Communications," Surface Vehicle Standard, Mar. 2016, 127 pages.

Unknown, "Subject Matter Eligibility Examples: Abstract Ideas," Jan. 7, 2019, pp. 1-20.

* cited by examiner

DETERMINING A CONTENT OF A MESSAGE USED TO COORDINATE INTERACTIONS AMONG VEHICLES

TECHNICAL FIELD

The disclosed technologies are directed to determining a content of a message used to coordinate interactions among vehicles.

BACKGROUND

Historically, operation of a vehicle in a manner that avoids a collision with another object has depended upon the efficacies of the senses of an operator of the vehicle. In the past few decades, technologies have been developed to assist or supersede reliance upon the senses of the operator. Such technologies can include, for example, sensors disposed on the vehicle, "connected car" technology, driving automation technology, and the like.

Sensors disposed on the vehicle can include, for example, one or more of global navigation satellite systems (GNNS), inertial measurement units (IMU), image sensors, cameras, radar systems, light detection and ranging (LIDAR) systems, ultrasonic systems, or the like.

"Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

"Vehicle to Vehicle" technology can be used, for example, to communicate a Basic Safety Message (BSM), a Collective Perception Message (CPM), or both. A Basic Safety Message can be used to communicate, to another vehicle, information about a vehicle that transmits the Basic Safety Message. Such information can include, for example, a position of the vehicle, a heading direction of the vehicle, a speed of the vehicle, a rate of acceleration of the vehicle, a size of the vehicle, and information about a status of brakes of the vehicle. A Collective Perception Message can be used to communicate, to another vehicle, information obtained from sensors disposed on a vehicle that transmits the Collective Perception Message. Such information can include, for example, a position of the vehicle, a distance and a direction from the vehicle to a detected object, a speed of the detected object, a size of the detected object, and a time at which the detected object was detected.

Driving automation technology can include, for example, an autonomous motion technology system. An autonomous motion technology system can be used to cause a vehicle to move independently in an environment with one or more other vehicles and/or objects. Such an autonomous motion technology system can be arranged to perform functions in stages. Such stages can include, for example, an information acquisition stage, a perception stage, and a control stage. The information acquisition stage can include technologies through which the vehicle can obtain information about the one or more other vehicles and/or objects in the environment of the vehicle and/or information about a location and/or a movement of the vehicle. The perception stage can perform functions on information from the information acquisition stage to produce information that facilitates a better understanding of the environment of the vehicle. The control stage can perform functions on information from the perception stage to produce: (1) a planned trajectory for the vehicle and (2) a control signal to cause the vehicle to move according to the planned trajectory. For example, the control signal can be communicated via a controller area network (CAN) bus to one or more vehicle systems of the vehicle to realize movement of the vehicle according to the planned trajectory. The one or more vehicle systems can include, for example, a propulsion system, a braking system, a steering system, a throttle system, a transmission system, a signaling system, and/or a navigation system.

SUMMARY

In an embodiment, a system for determining a content of a message used to coordinate interactions among vehicles can include a processor. The processor can include a processing device and a memory. The memory can store a discretization module and a communications module. The discretization module can include instructions that when executed by the processing device cause the processing device to: (1) analyze a critical maneuver trajectory of an ego vehicle and a current trajectory of another vehicle to determine an existence of a critical maneuver situation and (2) produce a discretized representation of a portion of the critical maneuver trajectory of the ego vehicle. A form of the discretized representation can be based on the existence of the critical maneuver situation. The communications module can include instructions that when executed by the processing device cause the processing device to communicate the discretized representation as the content of the message used to coordinate interactions among vehicles.

In another embodiment, a method for determining a content of a message used to coordinate interactions among vehicles can include analyzing, by a processing device, a critical maneuver trajectory of an ego vehicle and a current trajectory of another vehicle to determine an existence of a critical maneuver situation. The method can also include producing, by the processing device, a discretized representation of a portion of the critical maneuver trajectory of the ego vehicle. A form of the discretized representation can be based on the existence of the critical maneuver situation. The method can also include communicating, by the processing device, the discretized representation as the content of the message used to coordinate interactions among vehicles.

In another embodiment, a non-transitory computer-readable medium for determining a content of a message used to coordinate interactions among vehicles can include instructions that when executed by one or more processing devices cause the one or more processing devices to analyze a critical maneuver trajectory of an ego vehicle and a current trajectory of another vehicle to determine an existence of a critical maneuver situation. The non-transitory computer-readable medium can include instructions that when executed by the one or more processing devices cause the one or more processing devices to produce a discretized representation of a portion of the critical maneuver trajectory of the ego vehicle. A form of the discretized representation can be based on the existence of the critical maneuver situation. The non-transitory computer-readable medium can include instructions that when executed by the one or more processing devices cause the one or more processing devices to communicate the discretized representation as a content of a message used to coordinate interactions among vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
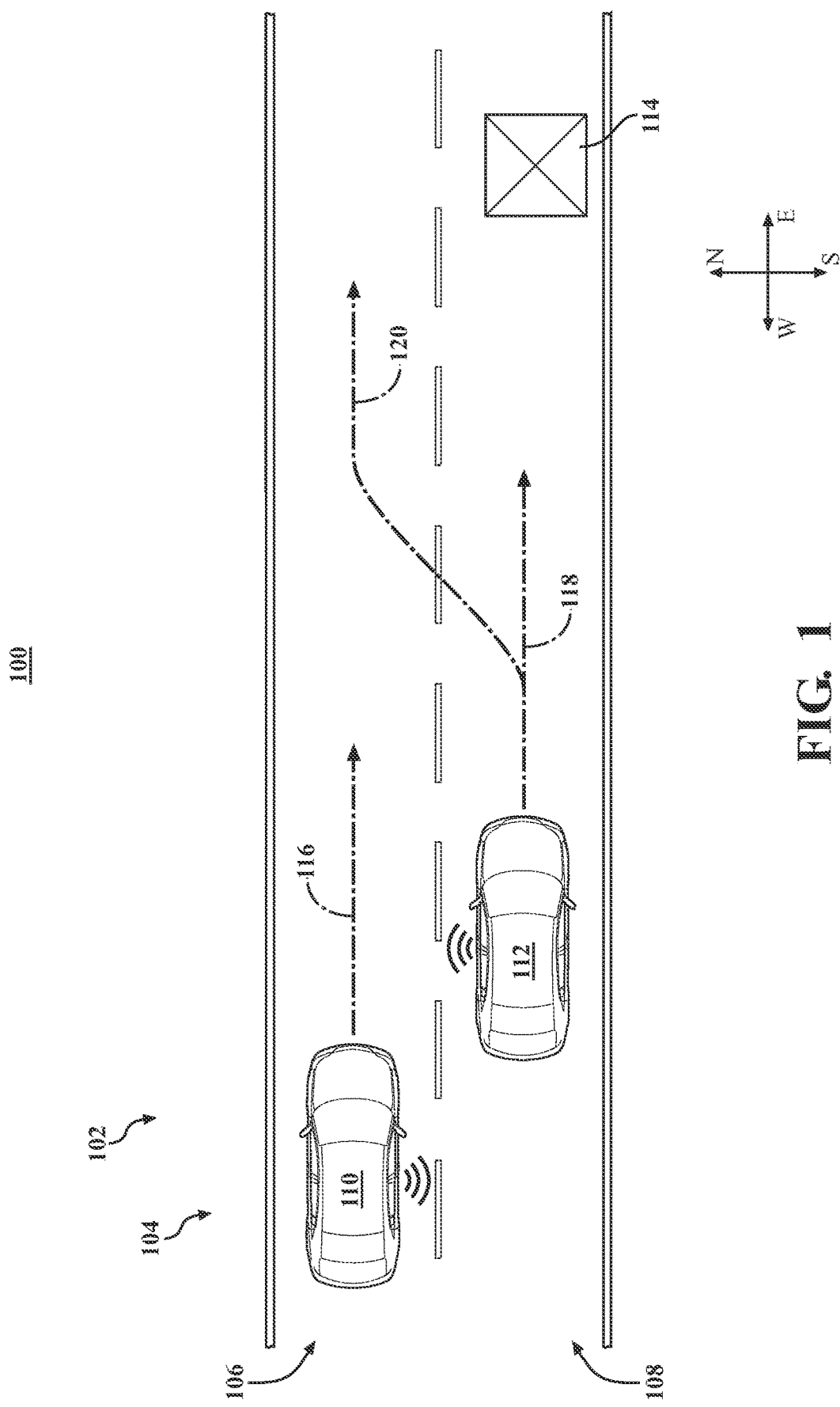
FIG. 1 includes a diagram that illustrates a first example of an environment for determining a content of a message used to coordinate interactions among vehicles, according to the disclosed technologies.

"Vehicle to Everything" technology can be used, for example, to communicate, between an ego vehicle and another vehicle, a Cooperative Maneuvering Message (CMM). For example, the Cooperative Maneuvering Message can be a Maneuver Coordination Message (MCM). A Cooperative Maneuvering Message can include, for example, information used to coordinate an interaction between the ego vehicle and the other vehicle. Such an interaction can include, for example, a merge, a lane change, a transition across an intersection, or the like. Information in a Cooperative Maneuvering Message can be used, for example, by the ego vehicle and the other vehicle to determine: (1) a priority right of way in accordance with rules of the road at a location of one or more of the ego vehicle or the other vehicle, (2) a manner in which the ego vehicle and the other vehicle will perform the merge, the lane change, the transition across the intersection, or (3) the like. Information in a Cooperative Maneuvering Message can be different from information in a Basic Safety Message (BSM), a Collective Perception Message (CPM), or the like. Information in the Cooperative Maneuvering Message can include, for example, one or more of a current trajectory of the ego vehicle, a critical maneuver trajectory of the ego vehicle, a current trajectory of the other vehicle, or a critical maneuver trajectory of the other vehicle. However, as a number of vehicles capable of communicating Cooperative Maneuvering Messages increases, a degree of utilization of a channel used for such messages (and possibly for Basic Safety Messages and Collective Perception Messages) can become so great that a rate of conveyance of such messages can be reduced. Such a reduction in the rate of conveyance of Cooperative Maneuvering Messages can undermine a purpose of these messages.

The disclosed technologies are directed to determining a content of a message used to coordinate interactions among vehicles. The message can include, for example, a Cooperative Maneuvering Message. A critical maneuver trajectory of an ego vehicle and a current trajectory of another vehicle can be analyzed to determine an existence of a critical maneuver situation. The critical maneuver situation can include, for example, a situation in which one or more of the ego vehicle or the other vehicle must perform a maneuver that causes one or more of: (1) a safety concern or (2) a lack of compliance with a priority right of way in accordance with rules of the road at a location of at least the ego vehicle or the other vehicle. A critical maneuver trajectory can be a trajectory that can cause a critical maneuver situation. A discretized representation of a portion of the critical maneuver trajectory of the ego vehicle can be produced. A form of the discretized representation can be based on the existence of the critical maneuver situation. The discretized representation can be communicated as the content of the message used to coordinate interactions among vehicles.

For example, the discretized representation can include information about a sequence of one or more points, per unit of time or unit of space, along the portion of the critical maneuver trajectory. Such a discretized representation can be referred to as bread crumbs. The form of this discretized representation can include, for example: (1) in response to the existence of the critical maneuver situation, consecutive points, in the sequence of the one or more points, having a first spacing interval between a first point, of the consecutive points, and a second point of the consecutive points and (2) in response to a lack of the existence of the critical maneuver situation, the consecutive points having a second spacing interval between the first point and the second point. The second spacing interval can be longer than the first spacing interval. Additionally or alternatively, for example, the discretized representation can include information about a sequence of one or more sections of a road along the portion of the critical maneuver trajectory. For example, such information about a section of a road can be included in a target road resource block. The form of this discretized representation can include, for example: (1) in response to the existence of the critical maneuver situation, having a section, of the one or more sections of the road, having an association with a duration of time, within the critical maneuver trajectory, during which the ego vehicle will perform a maneuver associated with the critical maneuver situation and (2) in response to a lack of the existence of the critical maneuver situation, having the section having a lack of the association with the duration of time, within the critical maneuver trajectory, during which the ego vehicle will perform the maneuver associated with the critical maneuver situation.

FIG. 1 includes a diagram that illustrates a first example 102 of an environment 100 for determining a content of a message used to coordinate interactions among vehicles, according to the disclosed technologies. The first example 102 can include a road 104 having a first lane 106 and a second lane 108. A first vehicle 110 can be located in the first lane 106. A second vehicle 112 can be located in the second lane 108. The first vehicle 110 can include "connected car" technology. The second vehicle 112 can include "connected car" technology. An object 114 can be located in the second lane 108. The first vehicle 110 can have a current trajectory 116 in an eastward direction in the first lane 106. The second vehicle 112 can have a current trajectory 118 in the eastward direction in the second lane 108. However, because of a presence of the object 114 in the second lane 108, the second vehicle 112 can also have a critical maneuver trajectory 120 that includes a lane change from the second lane 108 to the first lane 106.

Figure 2:
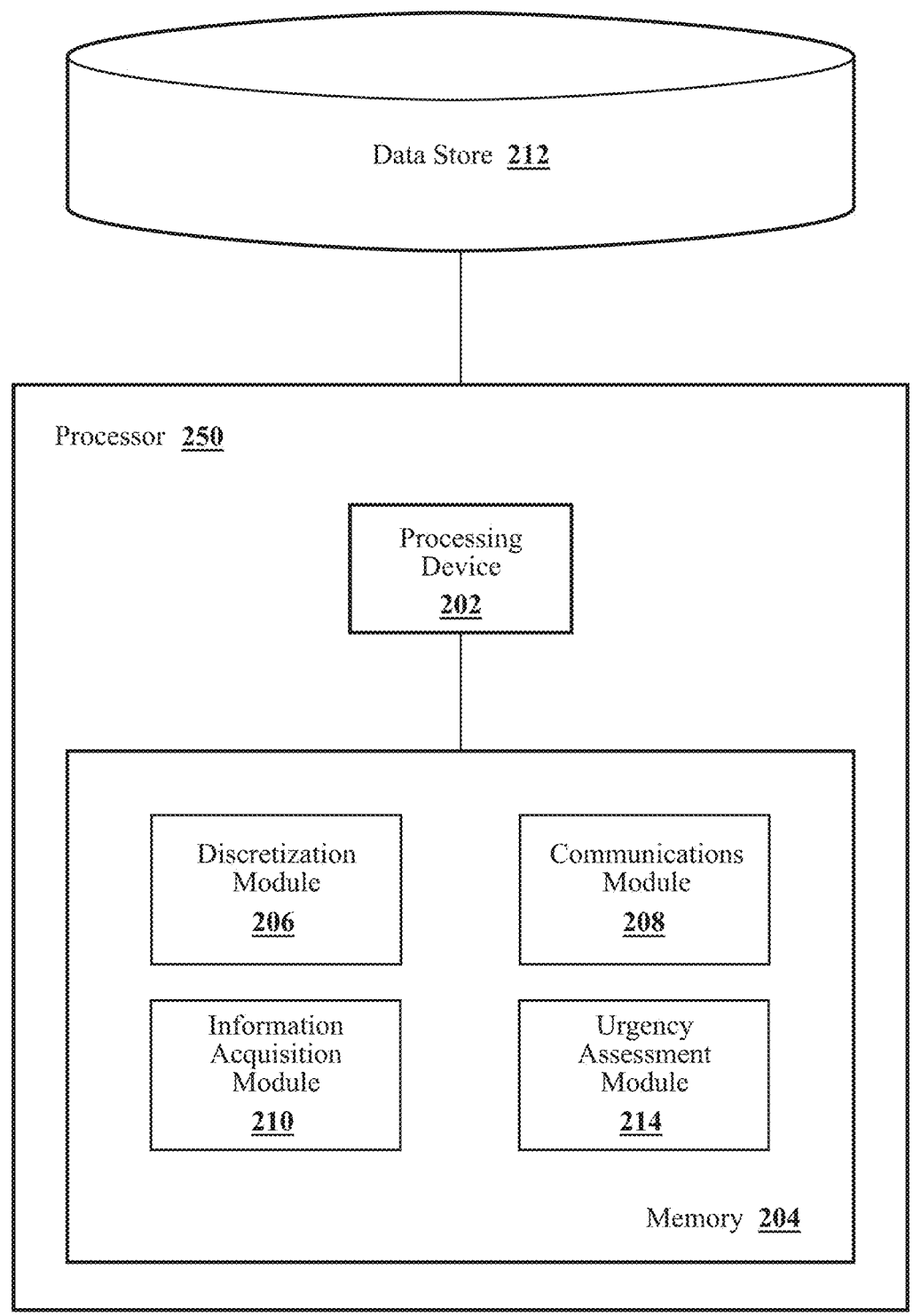
FIG. 2 includes a block diagram that illustrates an example of a system for determining a content of a message used to coordinate interactions among vehicles, according to the disclosed technologies.

FIG. 2 includes a block diagram that illustrates an example of a system 200 for determining a content of a message used to coordinate interactions among vehicles, according to the disclosed technologies. The system 200 can include, for example, a processor 250. The processor 250 can include, for example, a processing device 202 and a memory 204. The memory 204 can be communicably coupled to the processing device 202. For example, the memory 204 can store a discretization module 206 and a communications module 208. For example, the system 200 can be disposed on an ego vehicle.

The discretization module 206 can include instructions that function to control the processing device 202 to analyze a critical maneuver trajectory of the ego vehicle and a current trajectory of another vehicle to determine an existence of a critical maneuver situation.

The discretization module 206 can include instructions that function to control the processing device 202 to produce a discretized representation of a portion of the critical maneuver trajectory of the ego vehicle. A form of the discretized representation can be based on the existence of the critical maneuver situation.

The communications module 208 can include instructions that function to control the processing device 202 to communicate the discretized representation as the content of the message used to coordinate interactions among vehicles. The message can include, for example, a Cooperative Maneuvering Message.

For example, a critical maneuver situation can include a situation in which one or more of the ego vehicle or the other vehicle must perform a maneuver that causes one or more of: (1) a safety concern or (2) a lack of compliance with a priority right of way in accordance with rules of the road at a location of at least the ego vehicle or the other vehicle.

For example, the instructions to analyze the critical maneuver trajectory of the ego vehicle and the current trajectory of the other vehicle can include instructions to analyze, with respect to surrogate measures of safety (SMoS), the critical maneuver trajectory of the ego vehicle and the current trajectory of the other vehicle. The surrogate measures of safety can include, for example, one or more of time-to-collision (TTC), post-encroachment time (PET), or the like.

For example, with reference to FIG. 1, if the second vehicle 112 is the ego vehicle and the first vehicle 110 is the other vehicle, the critical maneuver trajectory 120 of the second vehicle 112 and the current trajectory 116 of the first vehicle 110 can be analyzed to determine an existence of a critical maneuver situation. The critical maneuver trajectory 120 of the second vehicle 112 and the current trajectory 116 of the first vehicle 110 can be analyzed to determine if the lane change, by the second vehicle 112, from the second lane 108 to the first lane 106 is a maneuver that causes a safety concern.

Figure 3:
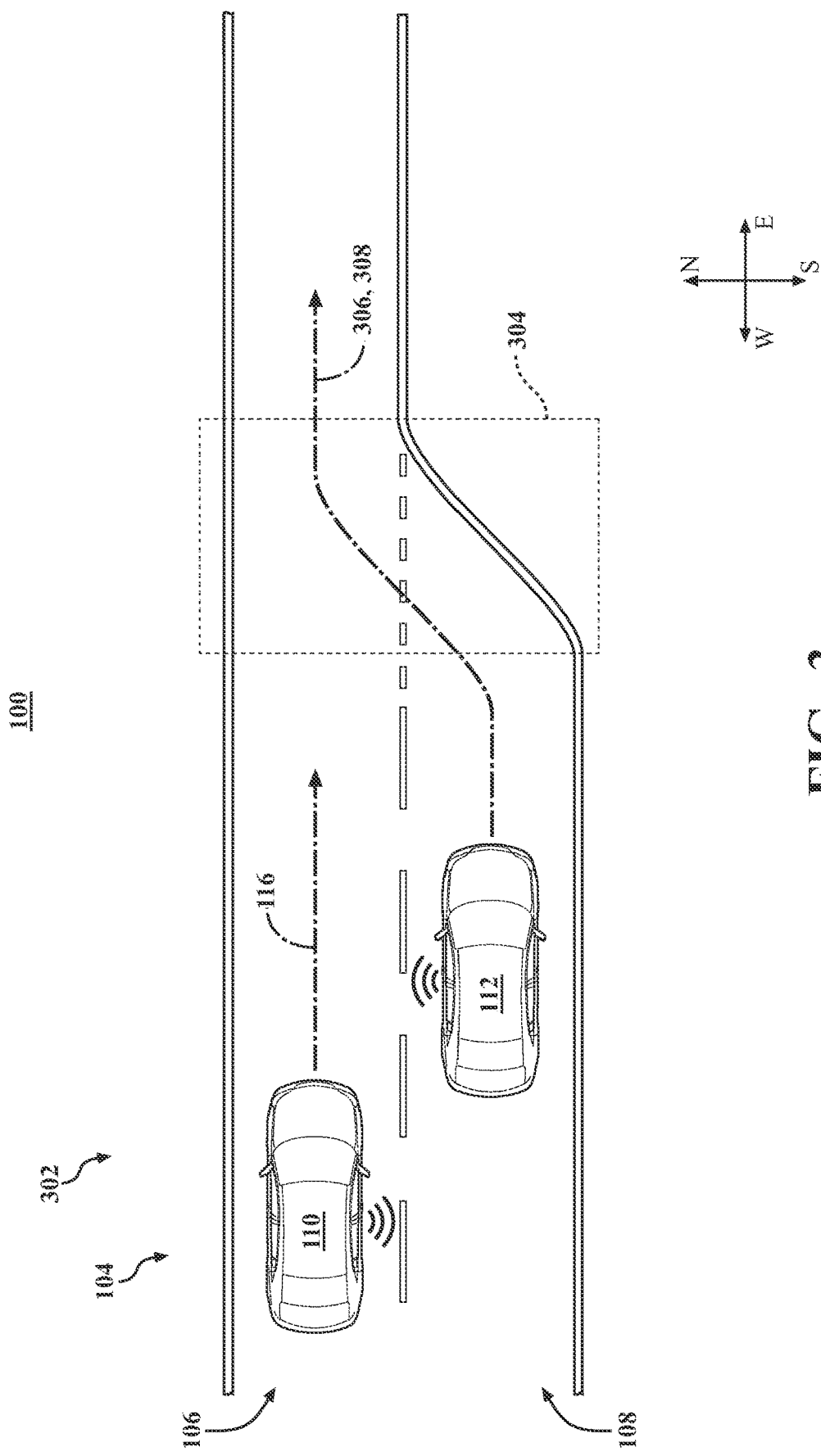
FIG. 3 includes a diagram that illustrates a second example of the environment for determining the content of the message used to coordinate interactions among vehicles, according to the disclosed technologies.

FIG. 3 includes a diagram that illustrates a second example 302 of the environment 100 for determining the content of the message used to coordinate interactions among vehicles, according to the disclosed technologies. The second example 302 can include the road 104 having the first lane 106 and the second lane 108. Within a region 304, the second lane 108 can end such that vehicles traveling in the second lane 108 must merge into the first lane 106. The first vehicle 110 can be located in the first lane 106. The second vehicle 112 can be located in the second lane 108. The first vehicle 110 can include "connected car" technology. The second vehicle 112 can include "connected car" technology. The first vehicle 110 can have the current trajectory 116 in the eastward direction in the first lane 106. The second vehicle 112 can have a current trajectory 306 and a critical maneuver trajectory 308. That is, the current trajectory 306 of the second vehicle 112 can be the critical maneuver trajectory 308 of the second vehicle 112. Because the second lane 108 ends within the region 304, the current trajectory 306 and the critical maneuver trajectory 308 of the second vehicle 112 can include a merge from the second lane 108 to the first lane 106.

For example, if the second vehicle 112 is the ego vehicle and the first vehicle 110 is the other vehicle, the critical maneuver trajectory 308 of the second vehicle 112 and the current trajectory 116 of the first vehicle 110 can be analyzed to determine if the merge, by the second vehicle 112, from the second lane 108 to the first lane 106 is a maneuver that causes a lack of compliance with a priority right of way (e.g., of the first vehicle 110) in accordance with rules of the road at a location of at least the second vehicle 112 or the first vehicle 110.

Returning to FIG. 2, in a configuration, the memory 204 can further store an information acquisition module 210. The information acquisition module 210 can include instructions that function to control the processing device 202 to obtain one or more of the critical maneuver of the ego vehicle, the current trajectory of the other vehicle, a current trajectory of the ego vehicle, or a critical maneuver trajectory of the other vehicle. For example, the instructions to obtain the one or more of the critical maneuver trajectory of the ego vehicle, the current trajectory of the other vehicle, the current trajectory of the ego vehicle, or the critical maneuver trajectory of the other vehicle can include instructions to obtain this information by one or more techniques.

For example, in a first technique, the instructions to obtain the one or more of the critical maneuver trajectory of the ego vehicle, the current trajectory of the other vehicle, the current trajectory of the ego vehicle, or the critical maneuver trajectory of the other vehicle can include instructions to receive, from one or more sensors, information about one or more objects in an environment of the ego vehicle.

For example, in a second technique, the instructions to obtain the one or more of the critical maneuver trajectory of the ego vehicle, the current trajectory of the other vehicle, the current trajectory of the ego vehicle, or the critical maneuver trajectory of the other vehicle can include instructions to receive, from one or more transmitters, one or more of: (1) the information about the one or more objects in the environment of the ego vehicle or (2) information about one or more of the current trajectory of the other vehicle or the critical maneuver trajectory of the other vehicle. For example, the one or more transmitters can be disposed on one or more of a connected vehicle or a roadside unit (RSU).

Figure 4:
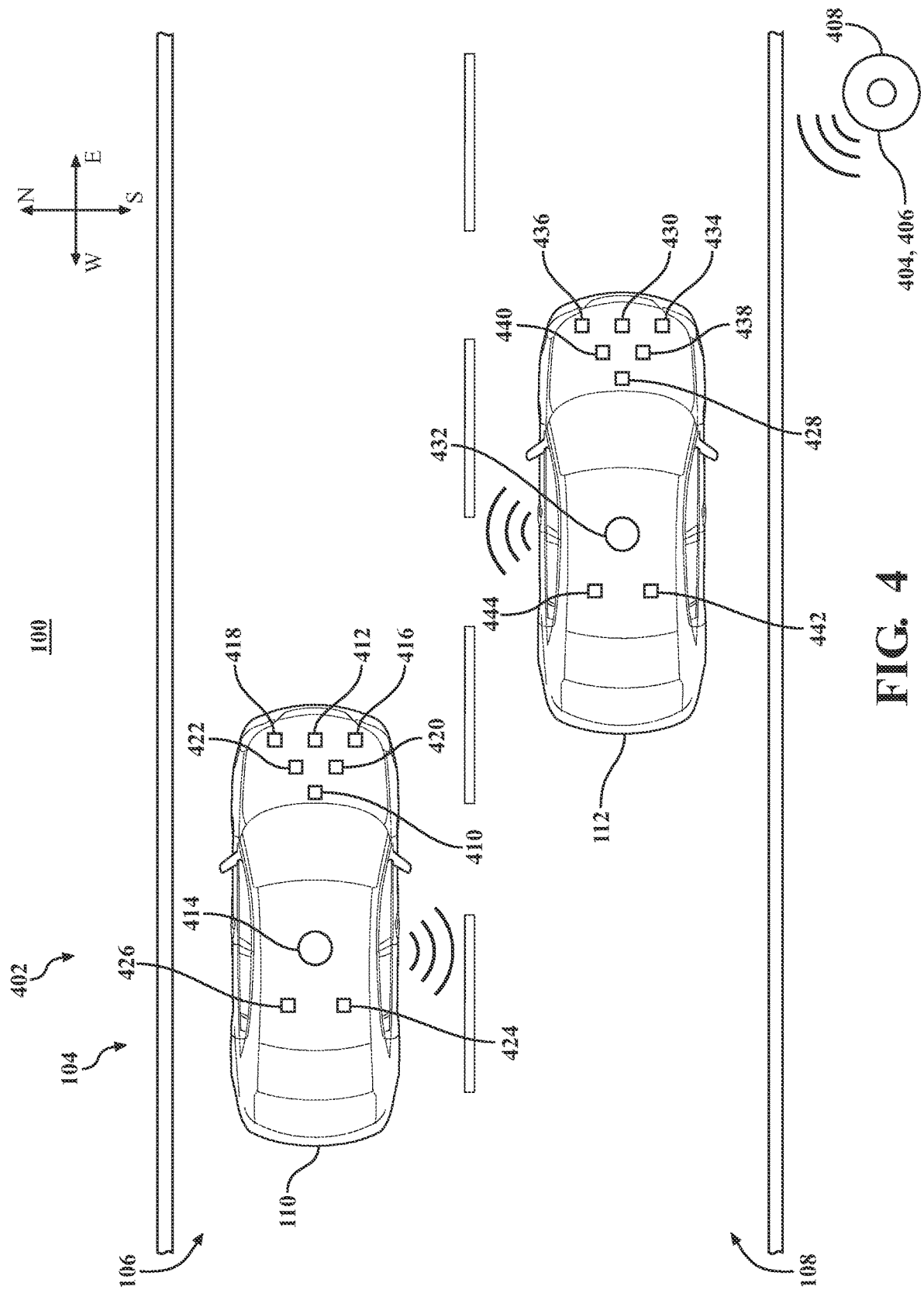
FIG. 4 includes a diagram that illustrates a third example of the environment for determining the content of the message used to coordinate interactions among vehicles, according to the disclosed technologies.

FIG. 4 includes a diagram that illustrates a third example 402 of the environment 100 for determining the content of the message used to coordinate interactions among vehicles, according to the disclosed technologies. The third example 402 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. A roadside unit 404 can be located near the second lane 108. For example, the roadside unit 404 can be a traffic light 406. A transmitter 408 can be disposed on the roadside unit 404. One or more sensors disposed on the first vehicle 110 can include, for example, a camera 410, a radar device 412, a lidar device 414, an ultrasonic device 416, an infrared device 418, a global navigation satellite system (GNNS) 420, an inertial measurement unit (IMU) 422, or the like. One or more of a transmitter 424 or a receiver 426 can be disposed on the first vehicle 110. One or more sensors disposed on the second vehicle 112 can include, for example, a camera 428, a radar device 430, a lidar device 432, an ultrasonic device 434, an infrared device 436, a global navigation satellite system 438, an inertial measurement unit 440, or the like. One or more of a transmitter 442 or a receiver 444 can be disposed on the second vehicle 112.

For example, if the second vehicle 112 is the ego vehicle and the first vehicle 110 is the other vehicle, then the second vehicle 112 can one or more of: (1) receive, from the one or more sensors disposed on the second vehicle 112, the information about the one or more objects in the environment of the second vehicle 112 or (2) receive, from one or more of the transmitter 424 disposed on the first vehicle 110 or the transmitter 408 disposed on the roadside unit 404 (e.g., the traffic light 406), the one or more of: (a) the information about the one or more objects in the environment of the second vehicle 112 or (b) the information about the one or more of the current trajectory of the first vehicle 110 or the critical maneuver trajectory of the first vehicle 110.

Returning to FIG. 2, for example, in a third technique, the system 200 can include a data store 212. The instructions to obtain the one or more of the critical maneuver trajectory of the ego vehicle, the current trajectory of the other vehicle, the current trajectory of the ego vehicle, or the critical maneuver trajectory of the other vehicle can include instructions to retrieve, from the data store 212, historical motion data about one or more of: (1) the ego vehicle or (2) a location of the ego vehicle.

For example, in a fourth technique, the instructions to obtain the one or more of the critical maneuver trajectory of the ego vehicle, the current trajectory of the other vehicle, the current trajectory of the ego vehicle, or the critical maneuver trajectory of the other vehicle can include instructions to produce a prediction of one or more of: (1) the current trajectory of the other vehicle or (2) the critical maneuver trajectory of the other vehicle.

In a configuration, the content of the message used to coordinate interactions among vehicles can include a duration of time of the portion of the critical maneuver trajectory.

In a configuration, a characteristic of the content of the message used to coordinate interactions among vehicles can be a function of a variable. The characteristic can be one or more of: (1) a duration of time of the portion of the critical maneuver trajectory or (2) a rate of discretization of at least a sub-portion of the portion of the critical maneuver trajectory. For example, the variable can include: (1) a value of a surrogate measure of safety (SMoS) (e.g., one or more of time-to-collision (TTC), post-encroachment time (PET), or the like), (2) a degree of utilization of a channel used for messages used to coordinate interactions among vehicles, (3) a measure of an amount of road traffic at a location of at least the ego vehicle or the other vehicle, or (4) the like. The value of the surrogate measure of safety can be an indication of a degree of a safety concern (e.g., a risk of collision), for one or more of the ego vehicle or the other vehicle, associated with the portion of the critical maneuver trajectory.

Figure 5:
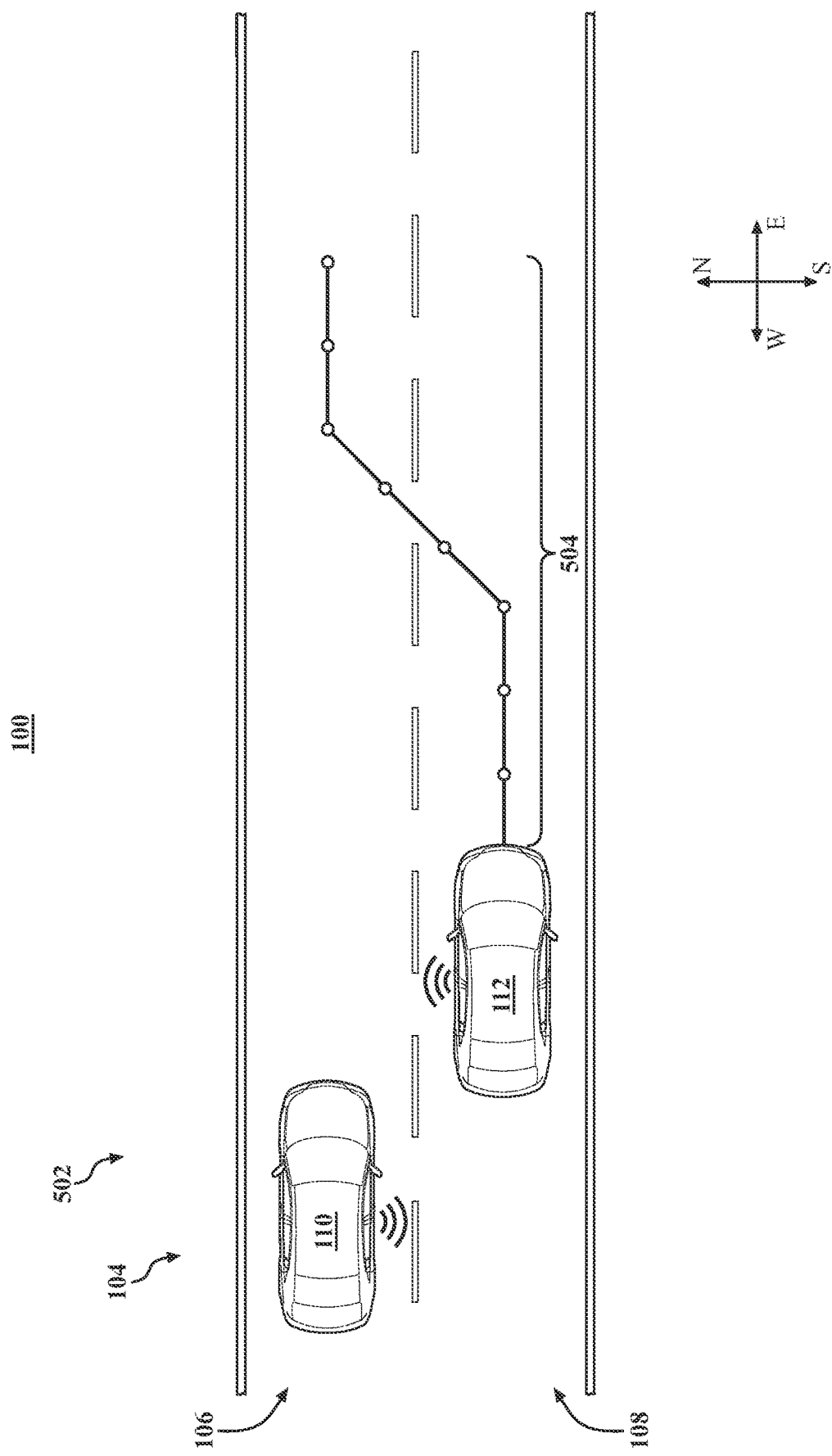
FIG. 5 includes a diagram that illustrates a fourth example of the environment for determining the content of the message used to coordinate interactions among vehicles, according to the disclosed technologies.

FIG. 5 includes a diagram that illustrates a fourth example 502 of the environment 100 for determining the content of the message used to coordinate interactions among vehicles, according to the disclosed technologies. The fourth example 502 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. The second vehicle 112 can have a critical maneuver trajectory 504. A characteristic of a content of a message used to coordinate interactions among vehicles can be one or more of: (1) a duration of time of a portion of the critical maneuver trajectory 504 (e.g., eight seconds) or (2) a rate of discretization of at least a sub-portion of the portion of the critical maneuver trajectory 504 (e.g., a sequence of one or more points per unit of time or unit of space, at a rate of one point per second, along the portion of the critical maneuver trajectory 504).

Figure 6:
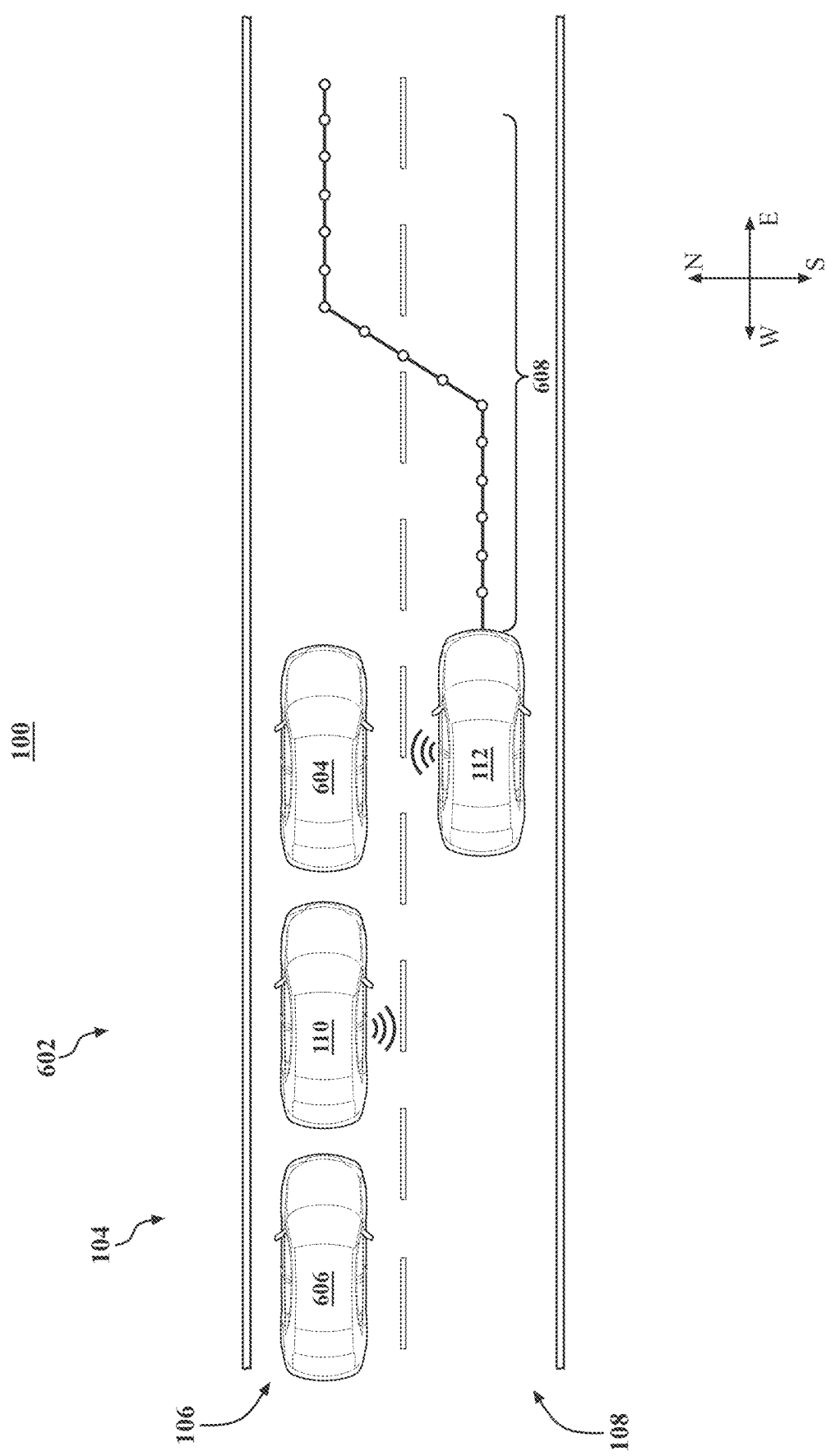
FIG. 6 includes a diagram that illustrates a fifth example of the environment for determining the content of the message used to coordinate interactions among vehicles, according to the disclosed technologies.

FIG. 6 includes a diagram that illustrates a fifth example 602 of the environment 100 for determining the content of the message used to coordinate interactions among vehicles, according to the disclosed technologies. The fifth example 602 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. A third vehicle 604 can be located in the first lane 106. A fourth vehicle 606 can be located in the first lane 106. The second vehicle 112 can have a critical maneuver trajectory 608. A characteristic of a content of a message used to coordinate interactions among vehicles can be one or more of: (1) a duration of time of a portion of the critical maneuver trajectory 608 (e.g., eight seconds) or (2) a rate of discretization of at least a subportion of the portion of the critical maneuver trajectory 608 (e.g., a sequence of one or more points per unit of time or unit of space, at a rate of two points per second, along the portion of the critical maneuver trajectory 608).

Figure 7:
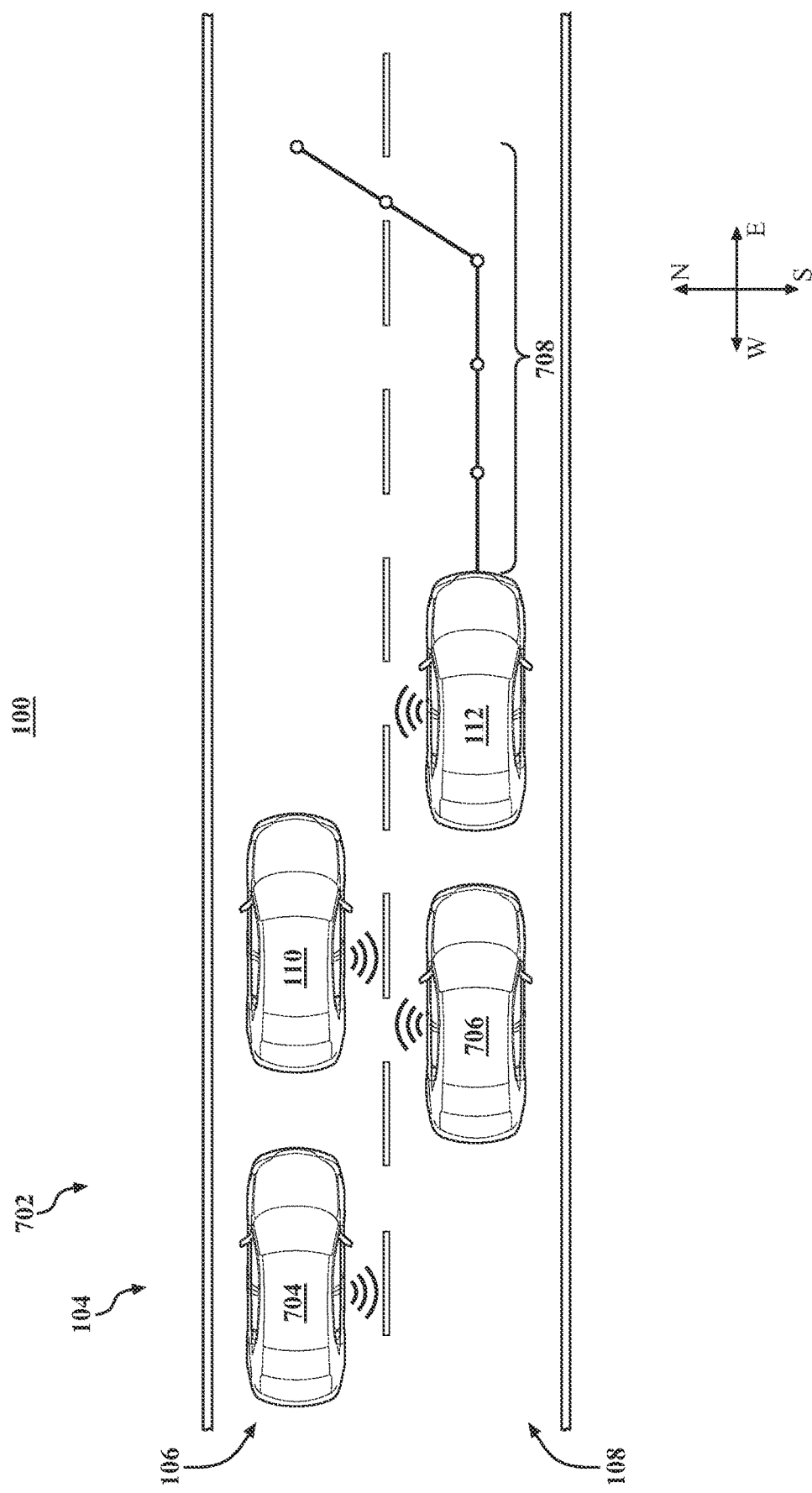
FIG. 7 includes a diagram that illustrates a sixth example of the environment for determining the content of the message used to coordinate interactions among vehicles, according to the disclosed technologies.

FIG. 7 includes a diagram that illustrates a sixth example 702 of the environment 100 for determining the content of the message used to coordinate interactions among vehicles, according to the disclosed technologies. The sixth example 702 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. A third vehicle 704 can be located in the first lane 106. A fourth vehicle 706 can be located in the second lane 108. The third vehicle 704 can include "connected car" technology. The fourth vehicle 706 can include "connected car" technology. The second vehicle 112 can have a critical maneuver trajectory 708. A characteristic of a content of a message used to coordinate interactions among vehicles can be one or more of: (1) a duration of time of a portion of the critical maneuver trajectory 708 (e.g., five seconds) or (2) a rate of discretization of at least a sub-portion of the portion of the critical maneuver trajectory 708 (e.g., a sequence of one or more points per unit of time or unit of space, at a rate of one point per second, along the portion of the critical maneuver trajectory 708).

For example, with reference to FIGS. 5 and 6, because a measure of an amount of road traffic at a location of the first vehicle 110 in the fifth example 602 can be greater than a measure of an amount of road traffic at a location of the first vehicle 110 in the fourth example 502, the rate of discretization of at least the sub-portion of the portion of the critical maneuver trajectory 608 (e.g., two points per second) in the fifth example 602 can be greater than the rate of discretization of at least the sub-portion of the portion of the critical maneuver trajectory 504 (e.g., one point per second) in the fourth example 502. For example, such a greater rate of discretization can provide the second vehicle 112 with more information that the second vehicle 112 can use, in a dense road traffic environment, to determine a trajectory of the second vehicle 112.

For example, with reference to FIGS. 5 and 7, because a degree of utilization of a channel used for messages used to coordinate interactions among vehicles in the sixth example 702 can be greater than a degree of utilization of a channel used for messages used to coordinate interactions among vehicles in the fourth example 502, the duration of time of the portion of the critical maneuver trajectory 708 (e.g., five seconds) in the sixth example 702 can be less than the duration of time of the portion of the critical maneuver trajectory 504 (e.g., eight seconds) in the fourth example 502.

Returning to FIG. 2, in a configuration, the discretized representation of the portion of the critical maneuver trajectory can include a first part of the discretized representation and a second part of the discretized representation. The first part can be associated with a first sub-portion of the portion. The first sub-portion can be characterized by an association with the critical maneuver situation. The second part can be associated with a second sub-portion of the portion. The second sub-portion can be characterized by a lack of the association with the critical maneuver situation.

Figure 8:
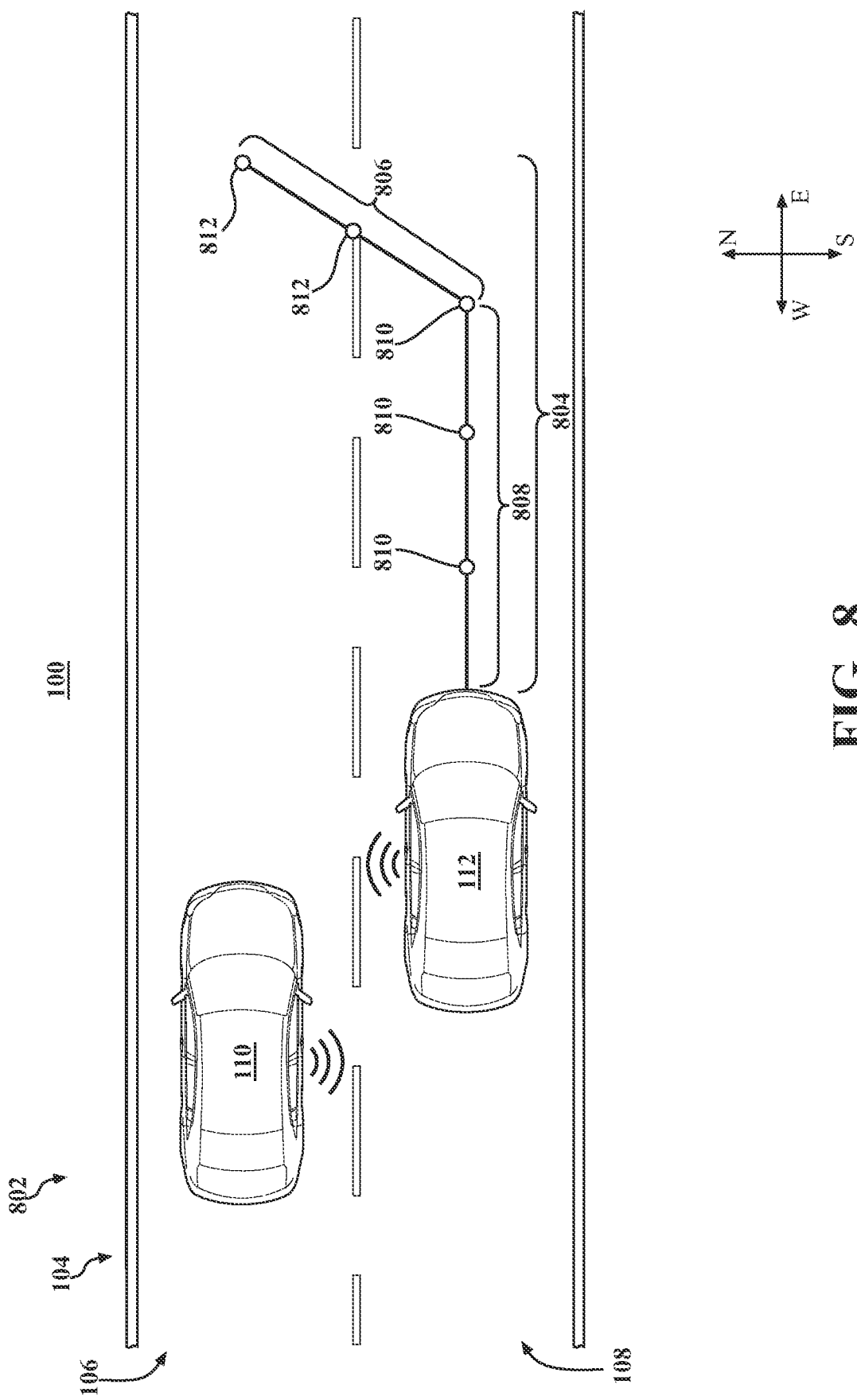
FIG. 8 includes a diagram that illustrates a seventh example of the environment for determining the content of the message used to coordinate interactions among vehicles, according to the disclosed technologies.

FIG. 8 includes a diagram that illustrates a seventh example 802 of the environment 100 for determining the content of the message used to coordinate interactions among vehicles, according to the disclosed technologies. The seventh example 802 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. The second vehicle 112 can have a critical maneuver trajectory 804. A portion of the critical maneuver trajectory 804 can have a first sub-portion 806 and a second sub-portion 808. The first sub-portion 806 can be characterized by an association with the critical maneuver situation. A first part 810 of a discretized representation of the portion of the critical maneuver trajectory 804 can be associated with the first sub-portion 806. The second sub-portion 808 can be characterized by a lack of the association with the critical maneuver situation. A second part 812 of the discretized representation of the portion of the critical maneuver trajectory 804 can be associated with the second sub-portion 808.

Returning to FIG. 2, in a configuration, the discretized representation can include information about a sequence of one or more points, per unit of time or unit of space (e.g., bread crumbs), along the portion of the critical maneuver trajectory. For example, the information can include, for a point of the sequence of the one or more points, one or more of a position of the point, an orientation of the ego vehicle at the point, a velocity of the ego vehicle at the point, an angular velocity of the ego vehicle at the point, an acceleration of the ego vehicle at the point, or the like.

For example, the form of the discretized representation can include: (1) in response to the existence of the critical maneuver situation, consecutive points, in the sequence of the one or more points, that have a first spacing interval between a first point, of the consecutive points, and a second point of the consecutive points and (2) in response to a lack of the existence of the critical maneuver situation, the consecutive points that have a second spacing interval between the first point and the second point. The second spacing interval can be longer than the first spacing interval. For example, the first spacing interval can be about 0.1 seconds. For example, the second spacing interval can be about 0.5 seconds or about one second.

Figure 9:
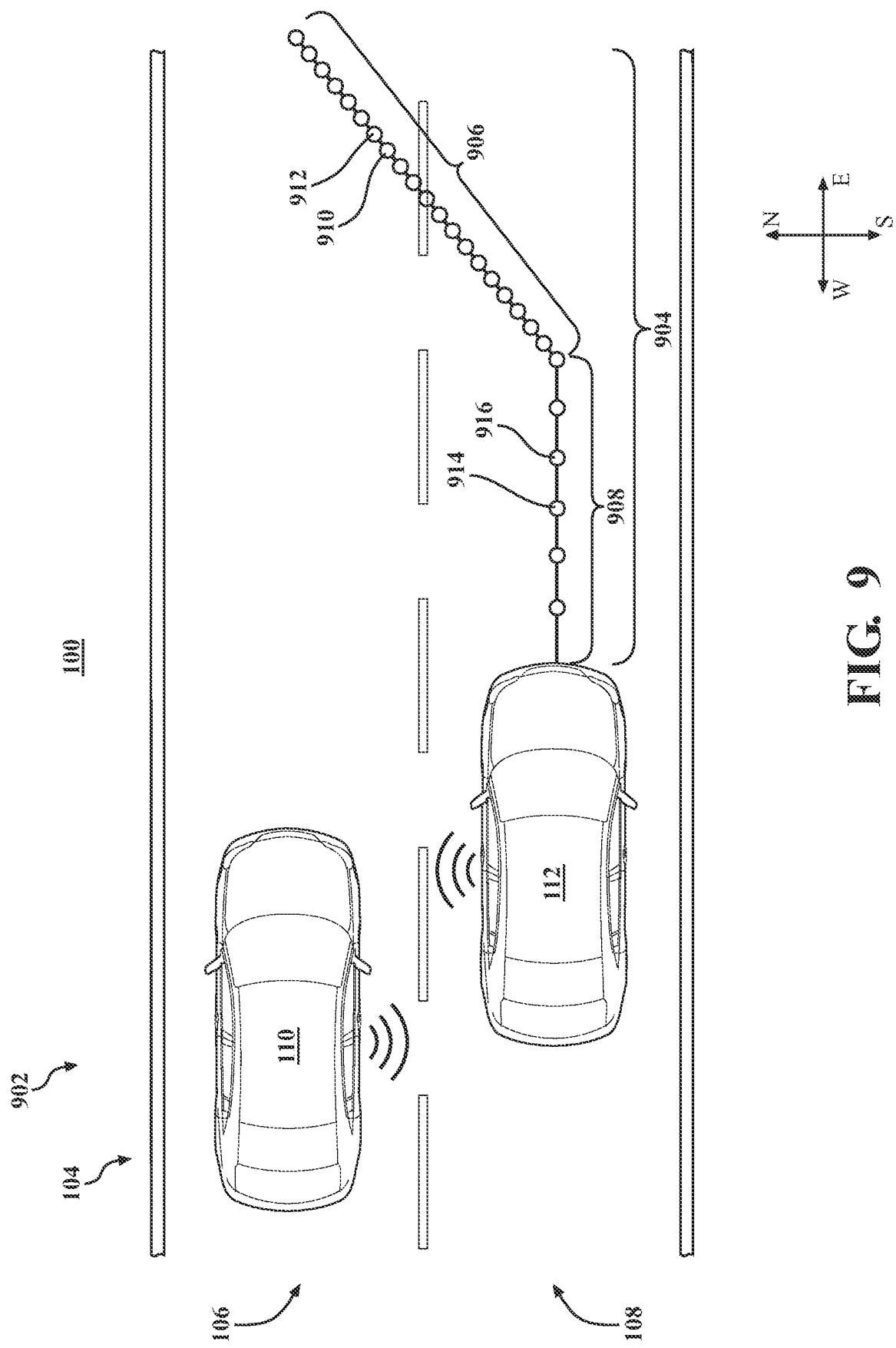
FIG. 9 includes a diagram that illustrates an eighth example of the environment for determining the content of the message used to coordinate interactions among vehicles, according to the disclosed technologies.

FIG. 9 includes a diagram that illustrates an eighth example 902 of the environment 100 for determining the content of the message used to coordinate interactions among vehicles, according to the disclosed technologies. The eighth example 902 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. The second vehicle 112 can have a critical maneuver trajectory 904. A portion of the critical maneuver trajectory 904 can have a first sub-portion 906 and a second sub-portion 908. The first sub-portion 906 can be characterized by an association with the critical maneuver situation. Consecutive points, in a sequence of one or more points in the first sub-portion 906, can have a first spacing interval between a first point 910, of the consecutive points, and a second point 912 of the consecutive points. The second sub-portion 908 can be characterized by a lack of the association with the critical maneuver situation. The consecutive points, in the sequence of the one or more points in the second sub-portion 908, can have a second spacing interval between a first point 914, of the consecutive points, and a second point 916 of the consecutive points.

Returning to FIG. 2, additionally or alternatively, the discretized representation can include information about a sequence of one or more sections of a road along the portion of the critical maneuver trajectory. For example, a section, of the one or more sections of the road, can be defined by one or more of an edge of the road, a boundary of a lane of the road, an angular velocity of the ego vehicle at a point along the portion of the critical maneuver trajectory, or the like.

For example, the form of the discretized representation can include: (1) in response to the existence of the critical maneuver situation, a section, of the one or more sections of the road, having an association with a duration of time, within the critical maneuver trajectory, during which the ego vehicle will perform a maneuver associated with the critical maneuver situation and (2) in response to a lack of the existence of the critical maneuver situation, the section having a lack of the association with the duration of time, within the critical maneuver trajectory, during which the ego vehicle will perform the maneuver associated with the critical maneuver situation.

Figure 10:
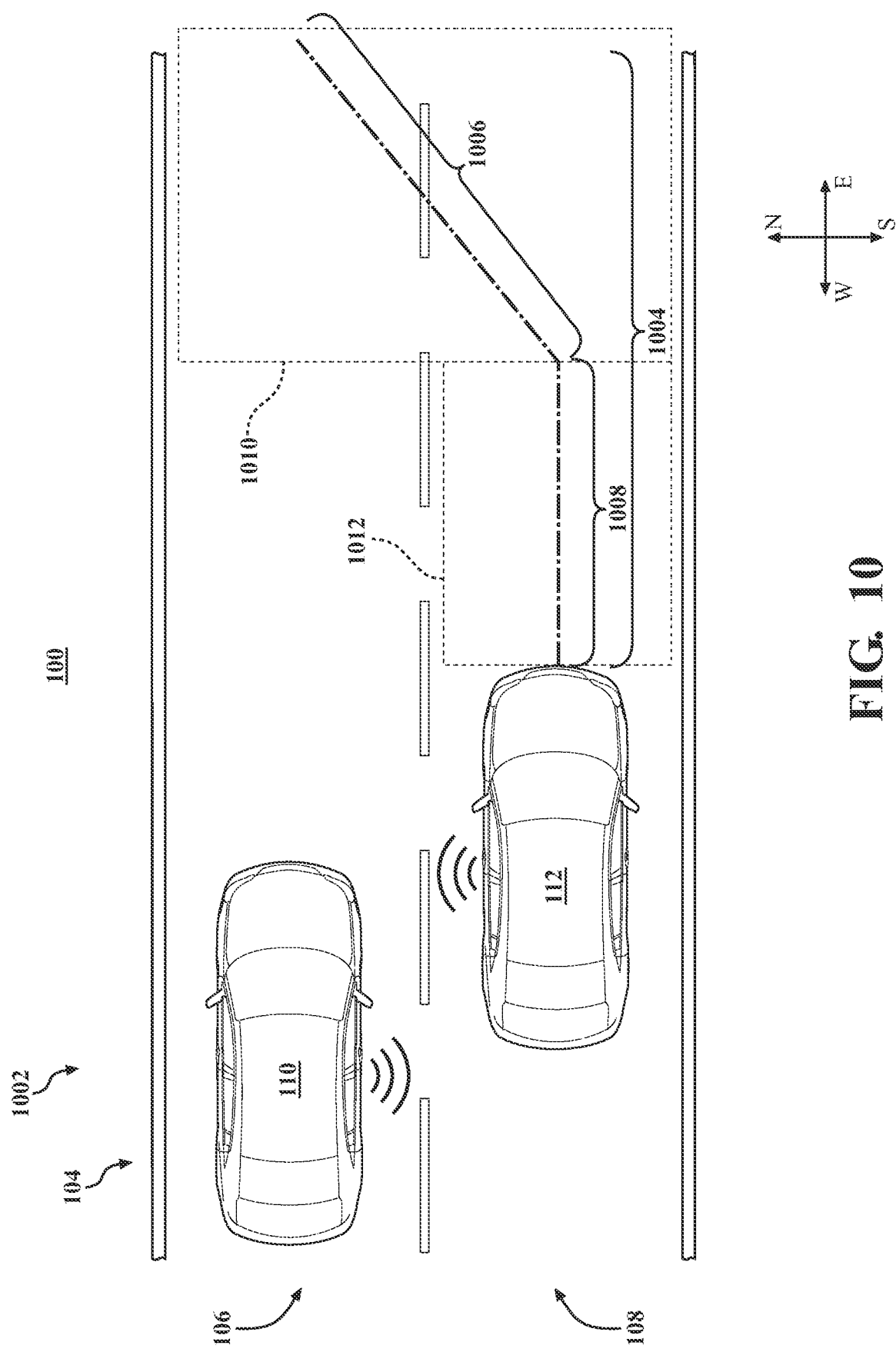
FIG. 10 includes a diagram that illustrates a ninth example of the environment for determining the content of the message used to coordinate interactions among vehicles, according to the disclosed technologies.

FIG. 10 includes a diagram that illustrates a ninth example 1002 of the environment 100 for determining the content of the message used to coordinate interactions among vehicles, according to the disclosed technologies. The ninth example 1002 can include the road 104 having the first lane 106 and the second lane 108. The first vehicle 110 can be located in the first lane 106. The second vehicle 112 can be located in the second lane 108. The first vehicle 110 can include "connected car" technology. The second vehicle 112 can include "connected car" technology. The second vehicle 112 can have a critical maneuver trajectory 1004. A portion of the critical maneuver trajectory 1004 can have a first sub-portion 1006 and a second sub-portion 1008. The first sub-portion 1006 can be characterized by an association with the critical maneuver situation. A section 1010 in the first sub-portion 1006, of one or more sections of a road, can have an association with a duration of time, within the critical maneuver trajectory 1004, during which the second vehicle 112 will perform a maneuver associated with the critical maneuver situation. The second sub-portion 1008 can be characterized by a lack of the association with the critical maneuver situation. A section 1012 in the second sub-portion 1008, of the one or more sections of the road, can have a lack of the association with the duration of time, within the critical maneuver trajectory 1004, during which the second vehicle 112 will perform the maneuver associated with the critical maneuver situation.

Returning to FIG. 2, in a configuration, the content of the message used to coordinate interactions among vehicles can exclude a sub-portion, of the portion of the critical maneuver trajectory, having an association with a duration of time, within the critical maneuver trajectory, during which the ego vehicle will perform a maneuver associated with the critical maneuver situation.

For example, with reference to FIGS. 9 and 10, the content of the message used to coordinate interactions among vehicles can exclude one or more of the first sub-portion 906 or the first sub-portion 1006. In this configuration, the content of the message used to coordinate interactions among vehicles can include one or more of the second sub-portion 908 or the second sub-portion 1008 so that the first vehicle 110 may determine an intent of the second vehicle 112. In this configuration, at a commencement of the duration of time, within the critical maneuver trajectory, during which the ego vehicle will perform the maneuver associated with the critical maneuver situation, the second vehicle 112 and the first vehicle 110 can negotiate a manner in which the second vehicle 112 will perform the maneuver associated with the critical maneuver situation.

Returning to FIG. 2, alternatively, the content of the message used to coordinate interactions among vehicles can: (1) exclude a sub-portion, of the portion of the critical maneuver trajectory, having a lack of an association with a duration of time, within the critical maneuver trajectory, during which the ego vehicle will perform a maneuver associated with the critical maneuver situation and (2) include the duration of time and a specific time, measured from a current time, at which the ego vehicle will commence to perform the maneuver associated with the critical maneuver situation.

For example, with reference to FIGS. 9 and 10, the content of the message used to coordinate interactions among vehicles can: (1) exclude one or more of the second sub-portion 908 or the second sub-portion 1008 and (2) include the duration of time (e.g., five seconds) and a specific time (e.g., three seconds), measured from a current time, at which the second vehicle 112 will commence to perform the maneuver associated with the critical maneuver situation. This configuration may be used, for example, in an environment in which a degree of utilization of a channel used for messages used to coordinate interactions among vehicles may be large because the content of the message used to coordinate interactions among vehicles may be limited to include only: (1) the first sub-portion 906 or the first sub-portion 1006 and (2) the duration of time (e.g., five seconds) and the specific time (e.g., three seconds), measured from the current time, at which the second vehicle 112 will commence to perform the maneuver associated with the critical maneuver situation (e.g., only information relevant to the maneuver associated with the critical maneuver situation).

Returning to FIG. 2, in a configuration, the form of the discretized representation can have a standard form and a modified form. The instructions to produce the discretized representation can include instructions to: (1) produce, in an absence of an analysis to determine the existence of the critical maneuver situation, the discretized representation having the standard form and (2) produce, based on information associated with the critical maneuver situation, the discretized representation having the modified form. The modified form can have additional information to augment the standard form.

For example, with reference to FIGS. 5 and 6, the form of the discretized representation can have: (1) a standard form associated with the portion of the critical maneuver trajectory 504 (e.g., the rate of discretization of the sequence of the one or more points, being one point per second) and (2) a modified form associated with the portion of the critical maneuver trajectory 608 (e.g., the rate of discretization of the sequence of the one or more points, being two points per second). The modified form (e.g., the portion of the critical maneuver trajectory 608) can have additional information (e.g., an additional point, each second, in the sequence of the one or more points) to augment the standard form (e.g., the portion of the critical maneuver trajectory 504).

Returning to FIG. 2, in this configuration, for example, the memory 204 can further store an urgency assessment module 214. The urgency assessment module 214 can include instructions that function to control the processing device 202 to: (1) calculate, in response to a determination of the existence of the critical maneuver situation, a duration of time between a current time and a time at which the ego vehicle will need to commence to perform a maneuver associated with the critical maneuver situation and (2)

determine an existence of a condition in which the duration of time is less than a threshold duration of time. In response to a determination of the existence of the condition, the form of the discretized representation can be the standard form.

For example, with reference to FIGS. 5 and 6, the duration of time between the current time and the time at which the second vehicle 112 will need to commence to perform the maneuver associated with the critical maneuver situation can be three seconds. If the threshold duration of time is four seconds, then a condition in which the duration of time is less than the threshold duration of time exists. In response to a determination of the existence of the condition, the form of the discretized representation can be the standard form (e.g., the portion of the critical maneuver trajectory 504). This configuration may be used, for example, in an environment in which a latency associated with selecting, as a characteristic of a content of a message, one or more of a rate of discretization or a duration of time of various sub-portions of the critical maneuver trajectory to augment the standard form may be great enough that a delay associated with a transmission of the message used to coordinate interactions among vehicles may undermine an efficacy of the additional information.

Figure 11:
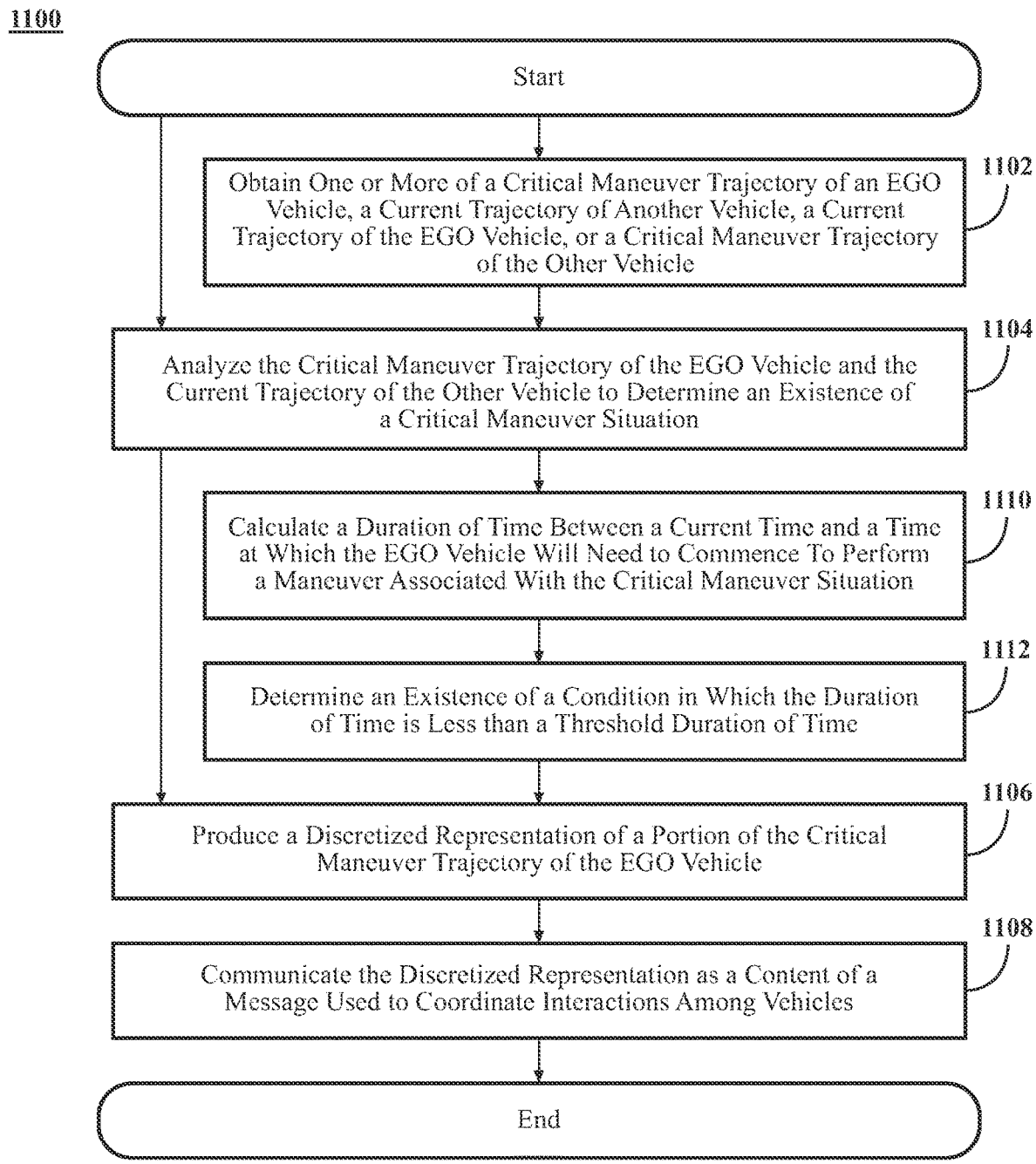
FIG. 11 is a flow diagram that illustrates an example of a method that is associated with determining the content of the message used to coordinate interactions among vehicles, according to the disclosed technologies.

FIG. 11 is a flow diagram that illustrates an example of a method 1100 that is associated with determining the content of the message used to coordinate interactions among vehicles, according to the disclosed technologies. The method 1100 is described from the perspective of the system 200 illustrated in FIG. 2. For example, the system 200 can be disposed on an ego vehicle. Although the method 1100 is described in combination with the system 200 illustrated in FIG. 2, one of skill in the art understands, in light of the description herein, that the method 1100 is not limited to being implemented by the system 200 illustrated in FIG. 2. Rather, the system 200 illustrated in FIG. 2 is an example of a system that may be used to implement the method 1100. Additionally, although the method 1100 is illustrated as a generally serial process, various aspects of the method 1100 may be able to be executed in parallel.

In FIG. 11, in the method 1100, at an operation 1102, for example, the information acquisition module 210 can obtain one or more of the critical maneuver trajectory of the ego vehicle, the current trajectory of the other vehicle, a current trajectory of the ego vehicle, or a critical maneuver trajectory of the other vehicle. For example, the information acquisition module 210 can obtain this information by one or more techniques.

For example, in a first technique, the information acquisition module 210 can receive, from one or more sensors, information about one or more objects in an environment of the ego vehicle.

For example, in a second technique, the information acquisition module 210 can receive, from one or more transmitters, one or more of: (1) the information about the one or more objects in the environment of the ego vehicle or (2) information about one or more of the current trajectory of the other vehicle or the critical maneuver trajectory of the other vehicle. For example, the one or more transmitters can be disposed on one or more of a connected vehicle or a roadside unit (RSU).

For example, in a third technique, the information acquisition module 210 can retrieve, from the data store 212, historical motion data about one or more of: (1) the ego vehicle or (2) a location of the ego vehicle.

For example, in a fourth technique, the information acquisition module 210 can produce a prediction of one or more of: (1) the current trajectory of the other vehicle or (2) the critical maneuver trajectory of the other vehicle.

At an operation 1104, for example, the discretization module 206 can analyze a critical maneuver trajectory of the ego vehicle and a current trajectory of another vehicle to determine an existence of a critical maneuver situation. For example, the discretization module 206 can analyze, with respect to surrogate measures of safety (SMoS), the critical maneuver trajectory of the ego vehicle and the current trajectory of the other vehicle. The surrogate measures of safety can include, for example, one or more of time-to-collision (TTC), post-encroachment time (PET), or the like. For example, the current trajectory of the ego vehicle can be the critical maneuver trajectory of the ego vehicle. For example, a critical maneuver situation can include a situation in which one or more of the ego vehicle or the other vehicle must perform a maneuver that causes one or more of: (1) a safety concern or (2) a lack of compliance with a priority right of way in accordance with rules of the road at a location of at least the ego vehicle or the other vehicle.

At an operation 1106, for example, the discretization module 206 can produce a discretized representation of a portion of the critical maneuver trajectory of the ego vehicle. A form of the discretized representation can be based on the existence of the critical maneuver situation.

At an operation 1108, for example, the communications module 208 can communicate the discretized representation as the content of the message used to coordinate interactions among vehicles. The message can include, for example, a Cooperative Maneuvering Message.

In a configuration, the content of the message used to coordinate interactions among vehicles can include a duration of time of the portion of the critical maneuver trajectory.

In a configuration, a characteristic of the content of the message used to coordinate interactions among vehicles can be a function of a variable. The characteristic can be one or more of: (1) a duration of time of the portion of the critical maneuver trajectory or (2) a rate of discretization of at least a sub-portion of the portion of the critical maneuver trajectory. For example, the variable can include: (1) a value of a surrogate measure of safety (SMoS) (e.g., one or more of time-to-collision (TTC), post-encroachment time (PET), or the like), (2) a degree of utilization of a channel used for messages used to coordinate interactions among vehicles, (3) a measure of an amount of road traffic at a location of at least the ego vehicle or the other vehicle, or (4) the like. The value of the surrogate measure of safety can be an indication of a degree of a safety concern (e.g., a risk of collision), for one or more of the ego vehicle or the other vehicle, associated with the portion of the critical maneuver trajectory.

In a configuration, the discretized representation of the portion of the critical maneuver trajectory can include a first part of the discretized representation and a second part of the discretized representation. The first part can be associated with a first sub-portion of the portion. The first sub-portion can be characterized by an association with the critical maneuver situation. The second part can be associated with a second sub-portion of the portion. The second sub-portion can be characterized by a lack of the association with the critical maneuver situation.

In a configuration, the discretized representation can include information about a sequence of one or more points, per unit of time or unit of space (e.g., bread crumbs), along the portion of the critical maneuver trajectory. For example, the information can include, for a point of the sequence of the one or more points, one or more of a position of the point, an orientation of the ego vehicle at the point, a velocity of the ego vehicle at the point, an angular velocity of the ego vehicle at the point, an acceleration of the ego vehicle at the point, or the like.

For example, the form of the discretized representation can include: (1) in response to the existence of the critical maneuver situation, consecutive points, in the sequence of the one or more points, that have a first spacing interval between a first point, of the consecutive points, and a second point of the consecutive points and (2) in response to a lack of the existence of the critical maneuver situation, the consecutive points that have a second spacing interval between the first point and the second point. The second spacing interval can be longer than the first spacing interval. For example, the first spacing interval can be about 0.1 seconds. For example, the second spacing interval can be about 0.5 seconds or about one second.

Additionally or alternatively, the discretized representation can include information about a sequence of one or more sections of a road along the portion of the critical maneuver trajectory. For example, a section, of the one or more sections of the road, can be defined by one or more of an edge of the road, a boundary of a lane of the road, an angular velocity of the ego vehicle at a point along the portion of the critical maneuver trajectory, or the like.

For example, the form of the discretized representation can include: (1) in response to the existence of the critical maneuver situation, a section, of the one or more sections of the road, having an association with a duration of time, within the critical maneuver trajectory, during which the ego vehicle will perform a maneuver associated with the critical maneuver situation and (2) in response to a lack of the existence of the critical maneuver situation, the section having a lack of the association with the duration of time, within the critical maneuver trajectory, during which the ego vehicle will perform the maneuver associated with the critical maneuver situation.

In a configuration, the content of the message used to coordinate interactions among vehicles can exclude a subportion, of the portion of the critical maneuver trajectory, having an association with a duration of time, within the critical maneuver trajectory, during which the ego vehicle will perform a maneuver associated with the critical maneuver situation.

Alternatively, the content of the message used to coordinate interactions among vehicles can: (1) exclude a subportion, of the portion of the critical maneuver trajectory, having a lack of an association with a duration of time, within the critical maneuver trajectory, during which the ego vehicle will perform a maneuver associated with the critical maneuver situation and (2) include the duration of time and a specific time, measured from a current time, at which the ego vehicle will commence to perform the maneuver associated with the critical maneuver situation.

In a configuration, the form of the discretized representation can have a standard form and a modified form. The discretization module 206 can: (1) produce, in an absence of an analysis to determine the existence of the critical maneuver situation, the discretized representation having the standard form and (2) produce, based on information associated with the critical maneuver situation, the discretized representation having the modified form. The modified form can have additional information to augment the standard form.

In this configuration, for example, at an operation 1110, the urgency assessment module 214 can calculate, in response to a determination of the existence of the critical maneuver situation, a duration of time between a current time and a time at which the ego vehicle will need to commence to perform a maneuver associated with the critical maneuver situation.

In this configuration, for example, at an operation 1112, the urgency assessment module 214 can determine an existence of a condition in which the duration of time is less than a threshold duration of time. In response to a determination of the existence of the condition, the form of the discretized representation can be the standard form.

Figure 12:
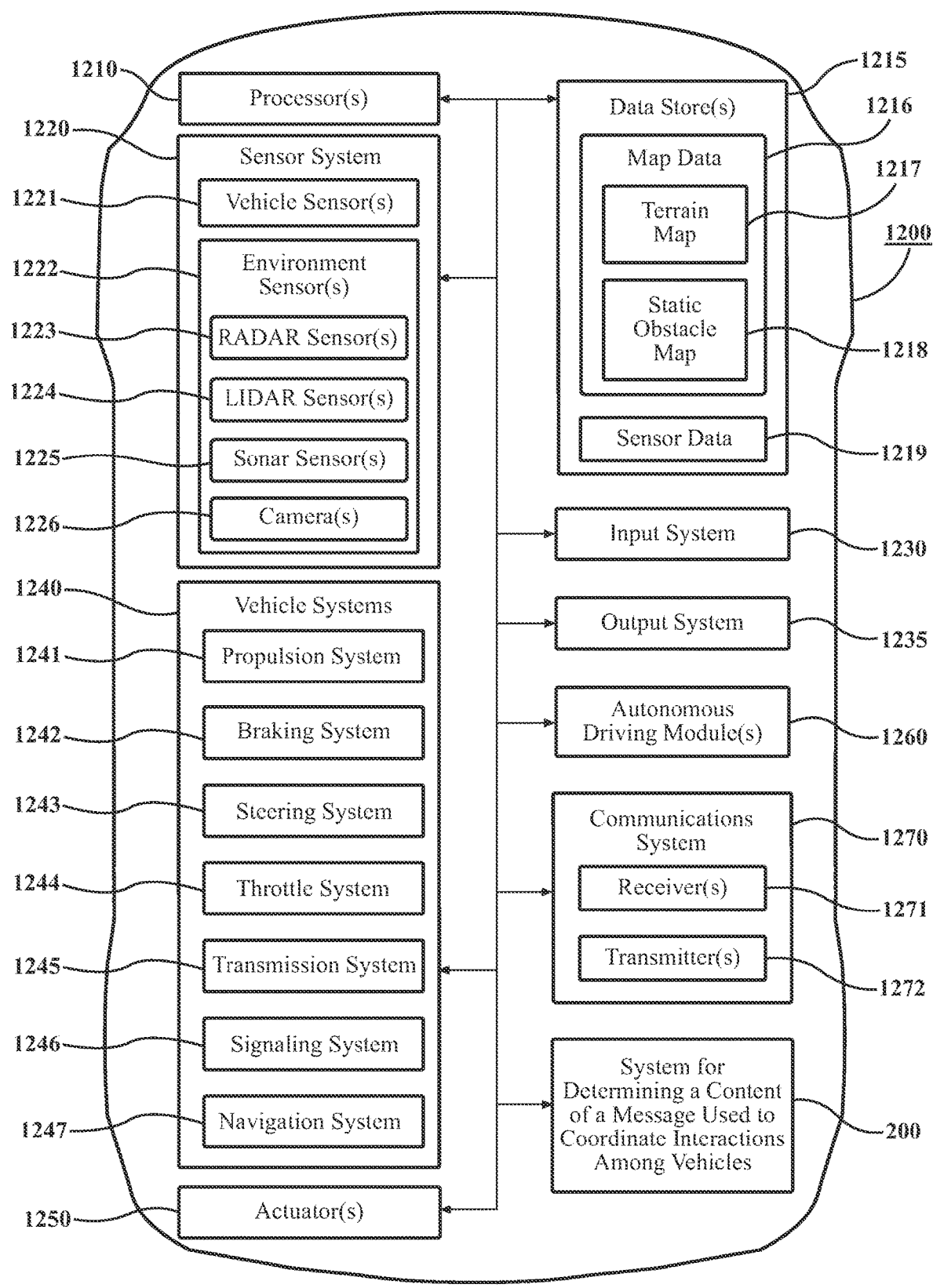
FIG. 12 includes a block diagram that illustrates an example of elements disposed on a vehicle, according to the disclosed technologies.

FIG. 12 includes a block diagram that illustrates an example of elements disposed on a vehicle 1200, according to the disclosed technologies. As used herein, a "vehicle" can be any form of powered transport. In one or more implementations, the vehicle 1200 can be an automobile. While arrangements described herein are with respect to automobiles, one of skill in the art understands, in light of the description herein, that embodiments are not limited to automobiles.

In some embodiments, the vehicle 1200 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 1200 is performed according to inputs received from a user (e.g., human driver). In one or more arrangements, the vehicle 1200 can be a conventional vehicle that is configured to operate in only a manual mode.

In one or more embodiments, the vehicle 1200 can be an automated vehicle. As used herein, "automated vehicle" can refer to a vehicle that operates in an automated mode. As used herein, "automated mode" can refer to navigating and/or maneuvering the vehicle 1200 along a travel route using one or more computing systems to control the vehicle 1200 with minimal or no input from a human driver. In one or more embodiments, the vehicle 1200 can be highly automated or completely automated. In one embodiment, the vehicle 1200 can be configured with one or more semi-automated operational modes in which one or more computing systems perform a portion of the navigation and/or maneuvering of the vehicle along a travel route, and a vehicle operator (i.e., driver) provides inputs to the vehicle 1200 to perform a portion of the navigation and/or maneuvering of the vehicle 1200 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 1200 can include various elements. The vehicle 1200 can have any combination of the various elements illustrated in FIG. 12. In various embodiments, it may not be necessary for the vehicle 1200 to include all of the elements illustrated in FIG. 12. Furthermore, the vehicle 1200 can have elements in addition to those illustrated in FIG. 12. While the various elements are illustrated in FIG. 12 as being located within the vehicle 1200, one or more of these elements can be located external to the vehicle 1200. Furthermore, the elements illustrated may be physically separated by large distances. For example, as described, one or more components of the disclosed system can be implemented within the vehicle 1200 while other components of the system can be implemented within a cloud-computing environment, as described below. For example, the elements can include one or more processors 1210, one or more data stores 1215, a sensor system 1220, an input system 1230, an output system 1235, vehicle systems 1240, one or more actuators 1250, one or more automated driving modules 1260, a communications system 1270, and the system 200 for determining a content of a message used to coordinate interactions among vehicles.

In one or more arrangements, the one or more processors 1210 can be a main processor of the vehicle 1200. For example, the one or more processors 1210 can be an electronic control unit (ECU). For example, functions and/or operations of the processing device 202 (illustrated in FIG. 2) can be realized by the one or more processors 1210.

The one or more data stores 1215 can store, for example, one or more types of data. For example, functions and/or operations of the memory 204, the data store 212 (illustrated in FIG. 2), or any combination thereof can be realized by the one or more data stores 1215. The one or more data stores 1215 can include volatile memory and/or non-volatile memory. Examples of suitable memory for the one or more data stores 1215 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1215 can be a component of the one or more processors 1210. Additionally or alternatively, the one or more data stores 1215 can be operatively connected to the one or more processors 1210 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1215 can store map data 1216. The map data 1216 can include maps of one or more geographic areas. In some instances, the map data 1216 can include information or data on roads, traffic control devices, road markings, structures, features, and/or landmarks in the one or more geographic areas. The map data 1216 can be in any suitable form. In some instances, the map data 1216 can include aerial views of an area. In some instances, the map data 1216 can include ground views of an area, including 360-degree ground views. The map data 1216 can include measurements, dimensions, distances, and/or information for one or more items included in the map data 1216 and/or relative to other items included in the map data 1216. The map data 1216 can include a digital map with information about road geometry. The map data 1216 can be high quality and/or highly detailed.

In one or more arrangements, the map data 1216 can include one or more terrain maps 1217. The one or more terrain maps 1217 can include information about the ground, terrain, roads, surfaces, and/or other features of one or more geographic areas. The one or more terrain maps 1217 can include elevation data of the one or more geographic areas. The map data 1216 can be high quality and/or highly detailed. The one or more terrain maps 1217 can define one or more ground surfaces, which can include paved roads, unpaved roads, land, and other things that define a ground surface.

In one or more arrangements, the map data 1216 can include one or more static obstacle maps 1218. The one or more static obstacle maps 1218 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1218 can have location data, size data, dimension data, material data, and/or other data associated with them. The one or more static obstacle maps 1218 can include measurements, dimensions, distances, and/or information for one or more static obstacles. The one or more static obstacle maps 1218 can be high quality and/or highly detailed. The one or more static obstacle maps 1218 can be updated to reflect changes within a mapped area.

In one or more arrangements, the one or more data stores 1215 can store sensor data 1219. As used herein, "sensor data" can refer to any information about the sensors with which the vehicle 1200 can be equipped including the capabilities of and other information about such sensors. The sensor data 1219 can relate to one or more sensors of the sensor system 1220. For example, in one or more arrangements, the sensor data 1219 can include information about one or more lidar sensors 1224 of the sensor system 1220.

In some arrangements, at least a portion of the map data 1216 and/or the sensor data 1219 can be located in one or more data stores 1215 that are located onboard the vehicle 1200. Alternatively or additionally, at least a portion of the map data 1216 and/or the sensor data 1219 can be located in one or more data stores 1215 that are located remotely from the vehicle 1200.

The sensor system 1220 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1220 includes a plurality of sensors, the sensors can work independently from each other. Alternatively, two or more of the sensors can work in combination with each other. In such a case, the two or more sensors can form a sensor network. The sensor system 1220 and/or the one or more sensors can be operatively connected to the one or more processors 1210, the one or more data stores 1215, and/or another element of the vehicle 1200 (including any of the elements illustrated in FIG. 12). The sensor system 1220 can acquire data of at least a portion of the external environment of the vehicle 1200 (e.g., nearby vehicles). The sensor system 1220 can include any suitable type of sensor. Various examples of different types of sensors are described herein. However, one of skill in the art understands that the embodiments are not limited to the particular sensors described herein.

The sensor system 1220 can include one or more vehicle sensors 1221. The one or more vehicle sensors 1221 can detect, determine, and/or sense information about the vehicle 1200 itself. In one or more arrangements, the one or more vehicle sensors 1221 can be configured to detect and/or sense position and orientation changes of the vehicle 1200 such as, for example, based on inertial acceleration. In one or more arrangements, the one or more vehicle sensors 1221 can include one or more accelerometers, one or more gyroscopes, an inertial measurement unit (IMU), a dead-reckoning system, a global navigation satellite system (GNSS), a global positioning system (GPS), a navigation system 1247, and/or other suitable sensors. For example, functions and/or operations of the global navigation satellite system 438, the inertial measurement unit 440 (illustrated in FIG. 4), or any combination thereof can be realized by the navigation system 1247. The one or more vehicle sensors 1221 can be configured to detect and/or sense one or more characteristics of the vehicle 1200. In one or more arrangements, the one or more vehicle sensors 1221 can include a speedometer to determine a current speed of the vehicle 1200.

Alternatively or additionally, the sensor system 1220 can include one or more environment sensors 1222 configured to acquire and/or sense driving environment data. As used herein, "driving environment data" can include data or information about the external environment in which a vehicle is located or one or more portions thereof. For example, the one or more environment sensors 1222 can be configured to detect, quantify, and/or sense obstacles in at least a portion of the external environment of the vehicle 1200 and/or information/data about such obstacles. Such obstacles may be stationary objects and/or dynamic objects. The one or more environment sensors 1222 can be configured to detect, measure, quantify, and/or sense other things in the external environment of the vehicle 1200 such as, for example, lane markers, signs, traffic lights, traffic signs, lane lines, crosswalks, curbs proximate the vehicle 1200, off-road objects, etc.

Various examples of sensors of the sensor system 1220 are described herein. The example sensors may be part of the one or more vehicle sensors 1221 and/or the one or more environment sensors 1222. However, one of skill in the art understands that the embodiments are not limited to the particular sensors described.

In one or more arrangements, the one or more environment sensors 1222 can include one or more radar sensors 1223, one or more lidar sensors 1224, one or more sonar sensors 1225, and/or one more cameras 1226. In one or more arrangements, the one or more cameras 1226 can be one or more high dynamic range (HDR) cameras or one or more infrared (IR) cameras. For example, the one or more cameras 1226 can be used to record a reality of a state of an item of information that can appear in the digital map. For example, functions and/or operations of the radar device 432 (illustrated in FIG. 4) can be realized by the one or more radar sensors 1223. For example, functions and/or operations of the lidar device 434 (illustrated in FIG. 4) can be realized by the one or more lidar sensors 1224. For example, functions and/or operations of the ultrasonic device 434 (illustrated in FIG. 4) can be realized by the one or more sonar sensors 1225. For example, functions and/or operations of the camera 428, the infrared device 436 (illustrated in FIG. 4), or any combination thereof can be realized by the one or more cameras 1226.

The input system 1230 can include any device, component, system, element, arrangement, or groups thereof that enable information/data to be entered into a machine. The input system 1230 can receive an input from a vehicle passenger (e.g., a driver or a passenger). The output system 1235 can include any device, component, system, element, arrangement, or groups thereof that enable information/data to be presented to a vehicle passenger (e.g., a driver or a passenger).

Various examples of the one or more vehicle systems 1240 are illustrated in FIG. 12. However, one of skill in the art understands that the vehicle 1200 can include more, fewer, or different vehicle systems. Although particular vehicle systems can be separately defined, each or any of the systems or portions thereof may be otherwise combined or segregated via hardware and/or software within the vehicle 1200. For example, the one or more vehicle systems 1240 can include a propulsion system 1241, a braking system 1242, a steering system 1243, a throttle system 1244, a transmission system 1245, a signaling system 1246, and/or the navigation system 1247. Each of these systems can include one or more devices, components, and/or a combination thereof, now known or later developed.

The navigation system 1247 can include one or more devices, applications, and/or combinations thereof, now known or later developed, configured to determine the geographic location of the vehicle 1200 and/or to determine a travel route for the vehicle 1200. The navigation system 1247 can include one or more mapping applications to determine a travel route for the vehicle 1200. The navigation system 1247 can include a global positioning system, a local positioning system, a geolocation system, and/or a combination thereof.

The one or more actuators 1250 can be any element or combination of elements operable to modify, adjust, and/or alter one or more of the vehicle systems 1240 or components thereof responsive to receiving signals or other inputs from the one or more processors 1210 and/or the one or more automated driving modules 1260. Any suitable actuator can be used. For example, the one or more actuators 1250 can include motors, pneumatic actuators, hydraulic pistons, relays, solenoids, and/or piezoelectric actuators.

The one or more processors 1210 and/or the one or more automated driving modules 1260 can be operatively connected to communicate with the various vehicle systems 1240 and/or individual components thereof. For example, the one or more processors 1210 and/or the one or more automated driving modules 1260 can be in communication to send and/or receive information from the various vehicle systems 1240 to control the movement, speed, maneuvering, heading, direction, etc. of the vehicle 1200. The one or more processors 1210 and/or the one or more automated driving modules 1260 may control some or all of these vehicle systems 1240 and, thus, may be partially or fully automated.

The one or more processors 1210 and/or the one or more automated driving modules 1260 may be operable to control the navigation and/or maneuvering of the vehicle 1200 by controlling one or more of the vehicle systems 1240 and/or components thereof. For example, when operating in an automated mode, the one or more processors 1210 and/or the one or more automated driving modules 1260 can control the direction and/or speed of the vehicle 1200. The one or more processors 1210 and/or the one or more automated driving modules 1260 can cause the vehicle 1200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 1270 can include one or more receivers 1271 and/or one or more transmitters 1272. For example, functions and/or operations of the receiver 444 (illustrated in FIG. 4) can be realized by the one or more receivers 1271. For example, functions and/or operations of the transmitter 442 (illustrated in FIG. 4) can be realized by the one or more receivers 1271. The communications system 1270 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 1270 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 1200 can include one or more modules, at least some of which are described herein. The modules can be implemented as computer-readable program code that, when executed by the one or more processors 1210, implement one or more of the various processes described herein. One or more of the modules can be a component of the one or more processors 1210. Alternatively or additionally, one or more of the modules can be executed on and/or distributed among other processing systems to which the one or more processors 1210 can be operatively connected. The modules can include instructions (e.g., program logic) executable by the one or more processors 1210. Alternatively or additionally, the one or more data store 1215 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 1200 can include one or more automated driving modules 1260. The one or more automated driving modules 1260 can be configured to receive data from the sensor system 1220 and/or any other type of system capable of capturing information relating to the vehicle 1200 and/or the external environment of the vehicle 1200. In one or more arrangements, the one or more automated driving modules 1260 can use such data to generate one or more driving scene models. The one or more automated driving modules 1260 can determine position and velocity of the vehicle 1200. The one or more automated driving modules 1260 can determine the location of obstacles, obstacles, or other environmental features including traffic signs, trees, shrubs, neighboring vehicles, pedestrians, etc.

The one or more automated driving modules 1260 can be configured to receive and/or determine location information for obstacles within the external environment of the vehicle 1200 for use by the one or more processors 1210 and/or one or more of the modules described herein to estimate position and orientation of the vehicle 1200, vehicle position in global coordinates based on signals from a plurality of satellites, or any other data and/or signals that could be used to determine the current state of the vehicle 1200 or determine the position of the vehicle 1200 with respect to its environment for use in either creating a map or determining the position of the vehicle 1200 in respect to map data.

The one or more automated driving modules 1260 can be configured to determine one or more travel paths, current automated driving maneuvers for the vehicle 1200, future automated driving maneuvers and/or modifications to current automated driving maneuvers based on data acquired by the sensor system 1220, driving scene models, and/or data from any other suitable source such as determinations from the sensor data 1219. As used herein, "driving maneuver" can refer to one or more actions that affect the movement of a vehicle. Examples of driving maneuvers include: accelerating, decelerating, braking, turning, moving in a lateral direction of the vehicle 1200, changing travel lanes, merging into a travel lane, and/or reversing, just to name a few possibilities. The one or more automated driving modules 1260 can be configured to implement determined driving maneuvers. The one or more automated driving modules 1260 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 1260 can be configured to execute various vehicle functions and/or to transmit data to, receive data from, interact with, and/or control the vehicle 1200 or one or more systems thereof (e.g., one or more of vehicle systems 1240). For example, functions and/or operations of an automotive navigation system can be realized by the one or more automated driving modules 1260.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-12, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processing device; and
   a memory storing:
      a discretization module including instructions that when executed by the processing device cause the processing device to:

analyze a critical maneuver trajectory of an ego vehicle and a current trajectory of another vehicle to determine an existence of a critical maneuver situation; and produce a discretized representation of a portion of the critical maneuver trajectory of the ego vehicle, a form of the discretized representation having:

a first spacing interval based on the existence of the critical maneuver situation, and a second spacing interval based on a lack of the existence of the critical maneuver situation, the second spacing interval being longer than the first spacing interval; and a communications module including instructions that when executed by the processing device cause the processing device to communicate, through a channel used for messages to coordinate interactions among vehicles and to the other vehicle, the discretized representation as a content of a message used to coordinate interactions among vehicles so that a degree of utilization of the channel, represented by an amount of information communicated per unit of time, at a time of the lack of the existence of the critical maneuver situation is less than a degree of utilization of the channel at a time of the existence of the critical maneuver situation.

2. The system of claim 1, wherein the critical maneuver situation comprises a situation in which at least one of the ego vehicle or the other vehicle must perform a maneuver that causes at least one of:

a safety concern, or a lack of compliance with a priority right of way in accordance with rules of the road at a location of at least the ego vehicle or the other vehicle.

3. The system of claim 1, wherein the instructions to analyze include instructions to analyze, with respect to surrogate measures of safety, the critical maneuver trajectory of the ego vehicle and the current trajectory of the other vehicle to determine the existence of the critical maneuver situation.

4. The system of claim 1, wherein the memory further stores an information acquisition module including instructions that when executed by the processing device cause the processing device to obtain at least one of the critical maneuver trajectory of the ego vehicle, the current trajectory of the other vehicle, a current trajectory of the ego vehicle, or a critical maneuver trajectory of the other vehicle.

5. The system of claim 1, wherein a characteristic of the content of the message used to coordinate interactions among vehicles is a function of a variable, the characteristic being at least one of:

a duration of time of the portion of the critical maneuver trajectory, or a rate of discretization of at least a sub-portion of the portion of the critical maneuver trajectory.

6. The system of claim 5, wherein the variable comprises at least one of:

a value of a surrogate measure of safety, a degree of utilization of a channel used for messages used to coordinate interactions among vehicles, or a measure of an amount of road traffic at a location of at least the ego vehicle or the other vehicle.

7. The system of claim 1, wherein the discretized representation of the portion of the critical maneuver trajectory comprises:

a first part of the discretized representation, the first part being associated with a first sub-portion of the portion, the first sub-portion being characterized by an association with the critical maneuver situation, and a second part of the discretized representation, the second part being associated with a second sub-portion of the portion, the second sub-portion being characterized by a lack of the association with the critical maneuver situation.

8. The system of claim 1, wherein the discretized representation comprises information about a sequence of at least one point along the portion of the critical maneuver trajectory.

9. The system of claim 8, wherein the information includes, for a point of the sequence of the at least one point, at least one of a position of the point, an orientation of the ego vehicle at the point, a velocity of the ego vehicle at the point, an angular velocity of the ego vehicle at the point, or an acceleration of the ego vehicle at the point.

10. The system of claim 8, wherein:

the form of the discretized representation comprises:

in response to the existence of the critical maneuver situation, consecutive points, in the sequence of the at least one point, having the first spacing interval between a first point, of the consecutive points, and a second point of the consecutive points, and in response to the lack of the existence of the critical maneuver situation, the consecutive points having the second spacing interval between the first point and the second point.

11. The system of claim 1, wherein the content of the message used to coordinate interactions among vehicles excludes a sub-portion, of the portion of the critical maneuver trajectory, having an association with a duration of time, within the critical maneuver trajectory, during which the ego vehicle will perform a maneuver associated with the critical maneuver situation.

12. The system of claim 1, wherein the content of the message used to coordinate interactions among vehicles:

excludes a sub-portion, of the portion of the critical maneuver trajectory, having a lack of an association with a duration of time, within the critical maneuver trajectory, during which the ego vehicle will perform a maneuver associated with the critical maneuver situation, and includes the duration of time and a specific time, measured from a current time, at which the ego vehicle will commence to perform the maneuver associated with the critical maneuver situation.

13. The system of claim 1, wherein:

the form of the discretized representation has a standard form and a modified form, and the instructions to produce the discretized representation include instructions to:

produce, in an absence of an analysis to determine the existence of the critical maneuver situation, the discretized representation having the standard form, and produce, based on information associated with the critical maneuver situation, the discretized representation having the modified form, the modified form having additional information to augment the standard form.

14. The system of claim 13, wherein the memory further stores an urgency assessment module including instructions that when executed by the processing device cause the processing device to:

calculate, in response to a determination of the existence of the critical maneuver situation, a duration of time between a current time and a time at which the ego vehicle will need to commence to perform a maneuver associated with the critical maneuver situation; and determine an existence of a condition in which the duration of time is less than a threshold duration of time, wherein, in response to a determination of the existence of the condition, the form of the discretized representation is the standard form.

15. A method, comprising:

analyzing, by a processing device, a critical maneuver trajectory of an ego vehicle and a current trajectory of another vehicle to determine an existence of a critical maneuver situation;

producing, by the processing device, a discretized representation of a portion of the critical maneuver trajectory of the ego vehicle, a form of the discretized representation having:
- a first spacing interval based on the existence of the critical maneuver situation, and
- a second spacing interval based on a lack of the existence of the critical maneuver situation, the second spacing interval being longer than the first spacing interval; and communicating, by the processing device and through a channel used for messages to coordinate interactions among vehicles and to the other vehicle, the discretized representation as a content of a message used to coordinate interactions among vehicles so that a degree of utilization of the channel, represented by an amount of information communicated per unit of time, at a time of the lack of the existence of the critical maneuver situation is less than a degree of utilization of the channel at a time of the existence of the critical maneuver situation.

16. The method of claim 15, wherein the current trajectory of the ego vehicle is the critical maneuver trajectory of the ego vehicle.

17. A non-transitory computer-readable medium for determining a content of a message used to coordinate interactions among vehicles, the non-transitory computer-readable medium including instructions that when executed by one or more processing devices cause the one or more processing devices to:

analyze a critical maneuver trajectory of an ego vehicle and a current trajectory of another vehicle to determine an existence of a critical maneuver situation;

produce a discretized representation of a portion of the critical maneuver trajectory of the ego vehicle, a form of the discretized representation having:
- a first spacing interval based on the existence of the critical maneuver situation, and
- a second spacing interval based on a lack of the existence of the critical maneuver situation, the second spacing interval being longer than the first spacing interval; and communicate, through a channel used for messages to coordinate interactions among vehicles and to the other vehicle, the discretized representation as the content of the message used to coordinate interactions among vehicles so that a degree of utilization of the channel, represented by an amount of information communicated per unit of time, at a time of the lack of the existence of the critical maneuver situation is less than a degree of utilization of the channel at a time of the existence of the critical maneuver situation.

* * * * *